(12) United States Patent
Dögel et al.

(10) Patent No.: US 9,964,176 B2
(45) Date of Patent: May 8, 2018

(54) TORSIONAL VIBRATION DAMPER ASSEMBLY WITH PRE-TENSIONING

(71) Applicant: ZF FRIEDRICHSHAFEN AG, Friedrichshafen (DE)

(72) Inventors: Thomas Dögel, Nüdlingen (DE); Uwe Grossgebauer, Erlabrunn (DE); Andreas Orlamünder, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 146 days.

(21) Appl. No.: 14/436,853

(22) PCT Filed: Sep. 23, 2013

(86) PCT No.: PCT/EP2013/069731
§ 371 (c)(1),
(2) Date: Apr. 17, 2015

(87) PCT Pub. No.: WO2014/060191
PCT Pub. Date: Apr. 24, 2014

(65) Prior Publication Data
US 2016/0169321 A1   Jun. 16, 2016

(30) Foreign Application Priority Data
Oct. 17, 2012   (DE) ........................ 10 2012 218 926

(51) Int. Cl.
*F16F 15/14*   (2006.01)
(52) U.S. Cl.
CPC ...... *F16F 15/1421* (2013.01); *F16F 15/1428* (2013.01)
(58) Field of Classification Search
CPC .. F16F 15/1202; F16F 15/1215; F16F 15/123; F16F 15/13128; F16F 15/1336;
(Continued)

(56) References Cited

U.S. PATENT DOCUMENTS

| 9,429,211 B2 * | 8/2016 | Orlamunder .......... F16F 15/123 |
| 9,556,928 B2 * | 1/2017 | Grossgebauer ..... F16F 15/1421 |

(Continued)

FOREIGN PATENT DOCUMENTS

| DE | 697 16 348 | 11/2003 |
| DE | 10 297 771 | 8/2005 |

(Continued)

OTHER PUBLICATIONS

Machine translation of DE 102010053542 A obtained on Dec. 2, 2016.*

*Primary Examiner* — Adam D Rogers
(74) *Attorney, Agent, or Firm* — Cozen O'Connor

(57) ABSTRACT

A torsional vibration damping arrangement particularly for the drivetrain of a vehicle, having a carrier arrangement which is rotatable around an axis of rotation, a deflection mass which is movable in circumferential direction relative to the carrier arrangement. The carrier arrangement and the deflection mass are coupled so as to be rotatable relative to one another via a plurality of radially extending, flexible restoring elements which are arranged in circumferential direction. A restoring element is deformable in each instance around a force application point which is movable in radial direction under centrifugal force and which is associated with the restoring element. A first restoring element is preloaded in a first direction in inactive position of the torsional vibration damping arrangement, and in that a second restoring element is preloaded in a second direction opposite to the first direction in the inactive position.

18 Claims, 17 Drawing Sheets

(58) Field of Classification Search
CPC .............. F16F 15/1421; F16F 15/1428; Y10T 74/2131
See application file for complete search history.

(56) References Cited

U.S. PATENT DOCUMENTS

| | | | |
|---|---|---|---|
| 9,599,188 B2 * | 3/2017 | Dogel | F16F 15/1202 |
| 2014/0102398 A1 * | 4/2014 | Orlamunder | F16F 15/12 |
| | | | 123/192.1 |
| 2015/0122605 A1 * | 5/2015 | Grossgebauer | F16F 15/1421 |
| | | | 192/3.21 |
| 2015/0316123 A1 * | 11/2015 | Dogel | F16H 45/02 |
| | | | 74/572.2 |
| 2016/0186835 A1 * | 6/2016 | Dogel | F16F 15/1202 |
| | | | 74/574.2 |

FOREIGN PATENT DOCUMENTS

| | | | | |
|---|---|---|---|---|
| DE | 10 2010 053 542 | | 6/2011 | |
| FR | 2828543 A1 * | | 2/2003 | ........ F16F 15/13157 |
| WO | WO 2004/016968 | | 2/2004 | |
| WO | WO 2013/152908 | | 10/2013 | |
| WO | WO 2014060351 A1 * | | 4/2014 | ............... F16D 3/56 |
| WO | WO 2016023795 A1 * | | 2/2016 | ............. F16H 45/02 |
| WO | WO 2016041744 A1 * | | 3/2016 | .......... F16F 15/1428 |

* cited by examiner

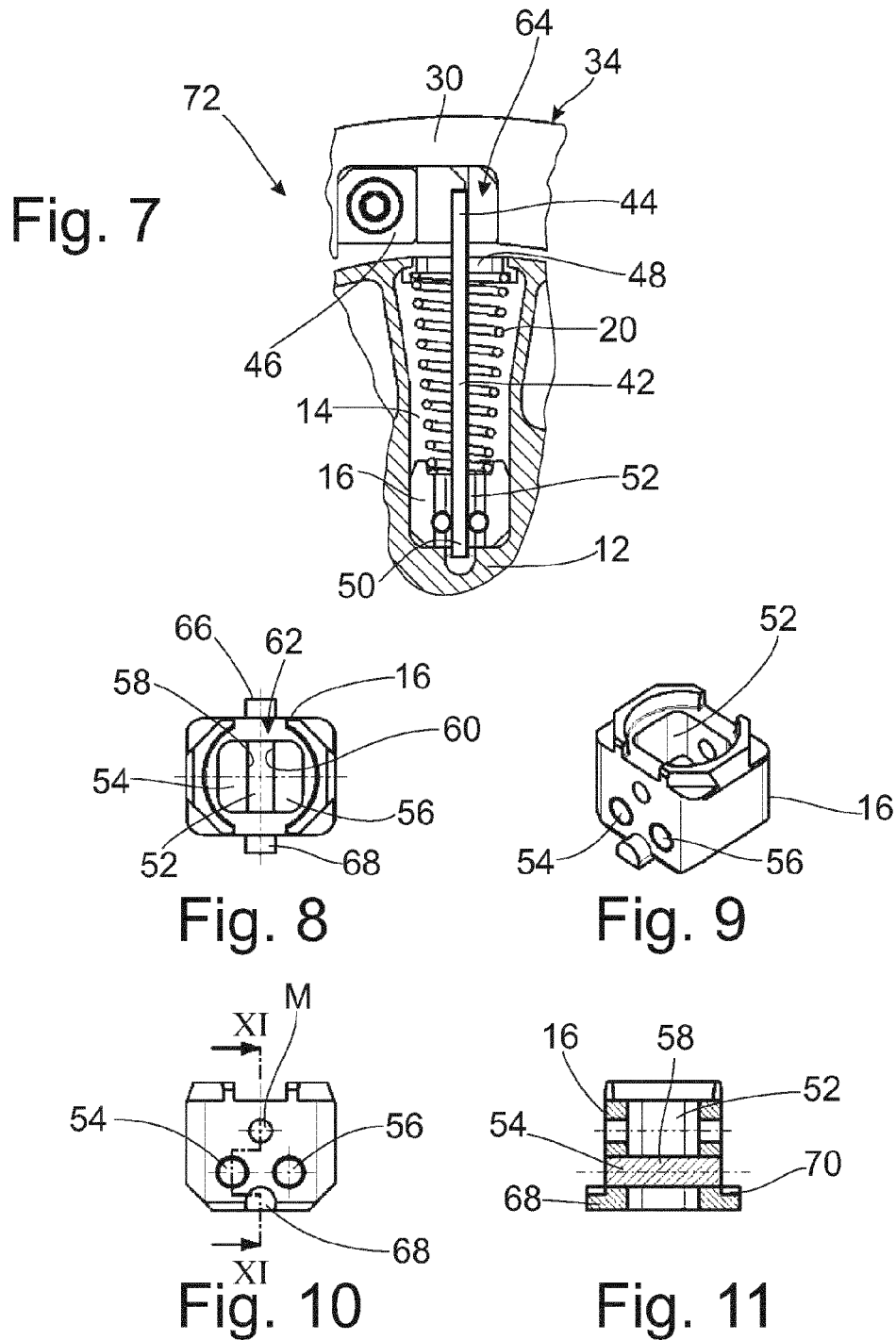

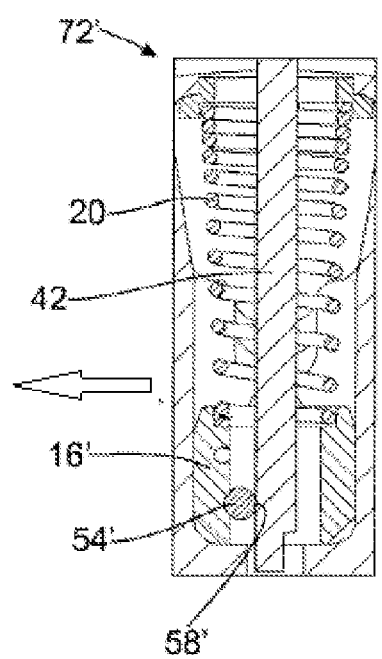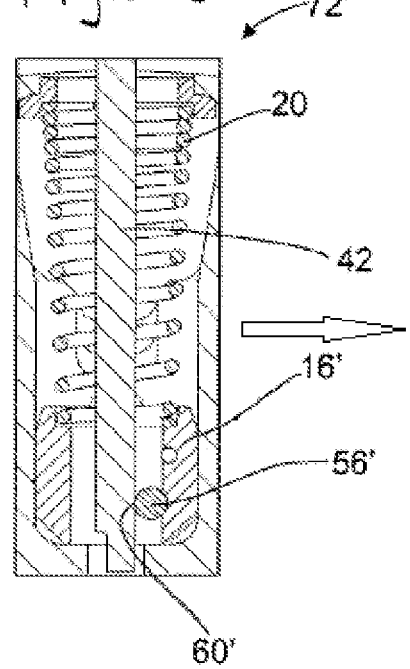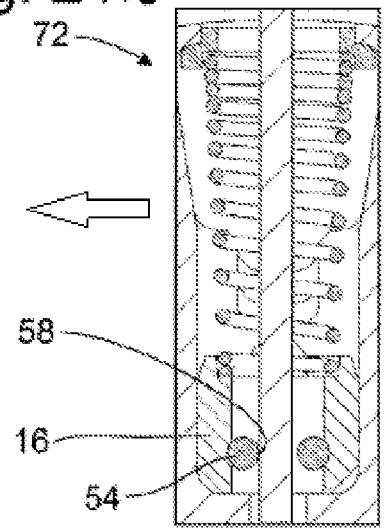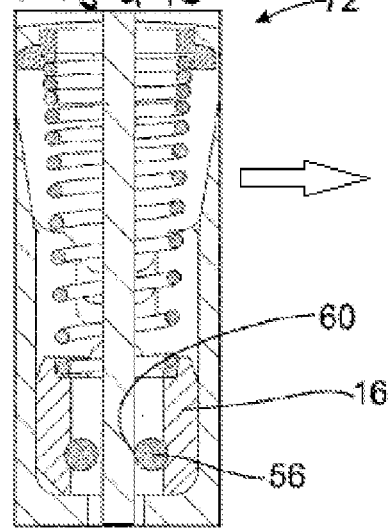

# TORSIONAL VIBRATION DAMPER ASSEMBLY WITH PRE-TENSIONING

CROSS REFERENCE TO RELATED APPLICATIONS

This is a U.S. national stage of application No. PCT/EP2013/069731, filed on Sep. 23, 2013. Priority is claimed on German Application No. DE102012218926.2, filed Oct. 17, 2012, the content of which is incorporated herein by reference.

BACKGROUND OF THE INVENTION

1. Field of the Invention

The present invention is directed generally to torsional vibration damping arrangements, preferably for the drivetrain of a vehicle, and particularly to torsional vibration damping arrangements with flexible restoring elements alternately preloaded in different directions.

2. Detailed Description of the Prior Art

Numerous concepts are known for damping vibrations, particularly torsional vibrations, which are caused, for example, by rotating components (e.g., a crankshaft) in a motor vehicle. Torsional vibration dampers can be employed alternatively or in addition to balance shafts. Torsional vibration dampers of this kind generally comprise damping masses or deflection masses, and unwanted torsional vibrations can be damped by the mass inertia of these damping masses or deflection masses. A known torque-transmitting torsional vibration damping concept for decoupling the flywheel mass system of the engine from the transmission and drivetrain, for example, is, e.g., the dual mass flywheel with a primary flywheel mass, a secondary flywheel mass and a torsional vibration damping arrangement mounted therebetween.

DE 10 2010 053 542 A1 discloses a torsional vibration damping arrangement or vibration absorber in which deflection mass pendulum units comprise a deflection mass arranged annularly around a carrier and is supported in circumferential direction with respect to the carrier by a plurality of elastically deformable restoring elements (e.g., leaf springs) which are secured thereto and extend radially inward. Provided in the carrier are radially displaceable flyweights or supporting elements at which the radially inwardly extending restoring elements can be supported in circumferential direction at respective carrier supporting regions or force application points. The supporting elements are preloaded radially inward into a basic position by preloading springs associated with these supporting elements and which are supported at the deflection mass. When there is little or no centrifugal force load, the flyweights or supporting elements are held in the basic position under preloading. As the rotational speed increases, the supporting elements shift radially outward as a result of centrifugal force as the compression of the preloading springs increases so that the carrier supporting regions at which the restoring elements extending radially inward from the deflection mass can be supported are displaced radially outward. This alters the free length of the restoring elements that is available for deflection between the connection thereof to the deflection mass and the respective carrier supporting regions in which they are supported via the supporting elements in circumferential direction with respect to the carrier. Accordingly, this variation of the free length also influences the effective pendulum length, shortening of which results in an increase in the natural frequency of the deflection mass pendulum units. As a result, the stiffness and therefore also the natural frequency of the deflection mass pendulum units is variable in a speed-dependent manner such that as the rotational speed increases the stiffness and therefore also the natural frequency of the torsional vibration damping arrangement increases. This is an attempt to achieve a speed adaptation of the deflection mass pendulum units to a vibration excitation order.

Known torsional vibration damping arrangements have an adjusting system that detunes the natural frequency of the torsional vibration damping arrangement or vibration absorber depending upon the speed in order to selectively cancel a vibration excitation order over a wide speed range. The adjusting system preferably comprises a plurality of flyweights or supporting elements which are distributed symmetrically around the circumference of the carrier to minimize unbalance and which are acted upon by a centrifugal force at speed. Further, the adjusting system comprises at least one restoring element or an adjusting spring that exerts a restoring force radially inward on the flyweight. The centrifugal force of the flyweights and the restoring forces of the springs are adapted to one another such that a desired position of the flyweight is achieved depending on current speed (order tracking). The position of a flyweight determines the force application point or oscillating point at a restoring element (e.g., flexible spring or vibration absorber spring) and accordingly directly influences the stiffness and, therefore, the natural frequency of the vibration absorber. The stiffness characteristic of the vibration absorber can be influenced by circumferential play (i.e., play in circumferential direction) between the restoring element and force application point or oscillating point.

SUMMARY OF THE INVENTION

It is an object of the present invention to provide a stiffness characteristic curve that is as linear as possible and strictly monotonic over an entire oscillating width or an entire oscillating angle range for a respective speed.

Friction of the flyweights at the restoring elements exerting substantially tangential forces influences the radial centrifugal force-dependent adjustment of the flyweights or supporting elements along the restoring elements (e.g., leaf springs). To minimize the influence of friction, it is expedient to make a portion of the oscillating angle of the torsional vibration damping arrangement in load-free condition available for the radial adjustment of the flyweights. Circumferential play between the flyweights and restoring elements (vibration absorber springs) may be useful for this purpose, but conflicts in terms of goals with a vibration absorber stiffness that is as constant as possible and that has a characteristic curve shape for the respective speed that is as linear as possible and is strictly monotonic. Embodiments are directed to the solution of this problem.

According to a first aspect of the present invention, a torsional vibration damping arrangement is provided that can be used particularly for damping torsional vibrations in the drivetrain of a vehicle, for example, a combustion-driven and/or electrically driven vehicle. The torsional vibration damping arrangement comprises a carrier arrangement rotatable around an axis of rotation and a pendulum mass or deflection mass movable in circumferential direction (i.e., tangentially) relative to the carrier arrangement. The carrier arrangement and the deflection mass are coupled so as to be rotatable relative to one another via a plurality of substantially or extensively radially extending, flexible restoring elements that are arranged in circumferential direction and which can also be referred to as vibration absorber springs or pendulum bars. At least one restoring element, but particularly all of the restoring elements, can be moved or oscillated around a force application point, which is movable in radial direction under centrifugal force and which is associated with the restoring element. In other words, the restoring element is deformable or bendable in each instance around a force application point movable in radial direction under centrifugal force and which is associated with the restoring element. In order to meet the above-stated object, it is suggested that a first flexible restoring element is preloaded or fixed in a first direction in the inactive position of the torsional vibration damping arrangement and a second flexible restoring element is preloaded or fixed in a second direction opposite to the first direction in the inactive position. In so doing, the restoring elements can be preloaded or bent indifferent or opposite directions with respect to a respectively associated force application point. By "inactive position" is meant herein a condition of undeflected deflection mass.

In one embodiment, the first restoring element and second restoring element can form a pair of restoring elements which are arranged directly adjacent to one another or opposite to one another in circumferential direction and which are elastically deformable in circumferential direction. The torsional vibration damping arrangement can have a plurality of pairs of restoring elements and corresponding deflection mass pendulum units, respectively, arranged in circumferential direction.

According to one embodiment, a flexible restoring element of the torsional vibration damping arrangement can comprise a restoring spring, particularly a leaf spring or a bar spring, particularly having a linear force characteristic curve. The restoring element can be secured or fixed with respect to the deflection mass and/or with respect to the carrier arrangement. In one embodiment, a radially extending restoring spring is fixed at the deflection mass and projects from the latter into a corresponding guide (located farther radially inward) of the carrier arrangement, in which guide a flyweight associated with the restoring spring can also move radially up and down and accordingly provides a radially variable force application point or oscillating point for the restoring element. During deflection of the deflection mass in circumferential direction, the restoring element is elastically deformed or bent in circumferential direction according to a force acting at the force application point.

In one embodiment, the preloading (in circumferential direction) of the restoring elements should be selected so as to be great enough, e.g., greater than 0.5% or 1% of the maximum bending of a restoring element, to eliminate the circumferential play in the adjusting system of the force application points under any manufacturing tolerances. The preloading of the restoring elements, i.e., the preloading angle, reduces a maximum permissible bending (maximum permissible oscillating angle) of the restoring elements based on maximum allowable bending stresses. Accordingly, the oscillating angle of the restoring elements is further limited in order to prevent an overloading of and, therefore, damage to the restoring elements or vibration absorber springs.

According to one embodiment, the preloading or preloading path should not exceed a certain upper limit. This upper limit depends on the radial adjusting path of the flyweights and the expected relative oscillating angle of the deflection mass (in circumferential direction). Identical circumferential play leads to a smaller clearance angle radially outwardly than radially inwardly, and the proportion of the oscillating angle under preloading is smaller radially outwardly than radially inwardly in exactly the same way. At high speeds, the stiffness of the restoring elements or vibration absorber springs is increased so that the bending thereof decreases assuming a constant vibration absorber torque compared to lower speeds. When the preloading of the vibration absorber springs reaches a value that is greater than the oscillating angle (e.g., at high speeds), a load-free condition is no longer achieved, so that the adjusting process of the flyweights is subject to additional friction forces.

According to one embodiment, the preloading of the restoring elements in the inactive position can be in a range of less than 10%, preferably less than 5%, of the maximum bending of the restoring elements. In this regard, in the inactive position a preloading force acts on the restoring elements in circumferential direction, which brings about a (slight) bending of the restoring elements.

In one embodiment, the opposed preloading forces resulting from the opposed preloading of the flexible restoring elements in the inactive position of the torsional vibration damping arrangement, i.e., with no deflection around a basic position, are identical in amount. In other words, in the inactive position of the torsional vibration damping arrangement the opposed preloading forces add to zero so that there can be no deflection without external torque action.

In one embodiment of a torsional vibration damping arrangement, at least one (radially) movable force application point is provided in each instance for each restoring element through a flyweight which is movable or displaceable along the associated restoring element in radial direction under centrifugal force. This flyweight is also referred to herein as supporting element. To this end, the flyweight can have, either on only one side or on both sides of the restoring element, circumferential supporting regions, for example, in the form of pins, around which the restoring element can oscillate or deform during deflection. According to one embodiment, in the inactive position the first flexible restoring element and the second flexible restoring element can be in direct pressing contact with at least one of the force application points associated therewith, i.e., a circumferential supporting region, in order to achieve the respective inactive position preloading of the restoring element. A restoring element is preferably in direct contact with only exactly one force application point (e.g., pin of the flyweight) in the inactive position.

According to one embodiment, the first restoring element and second restoring element form a pair of restoring elements which neutralize one another in the inactive position of the torsional vibration damping arrangement. A first flyweight movable in radial direction along the first restoring element and a second flyweight movable in radial direction along the second restoring element contact their associated first restoring element and second restoring element on different sides of the restoring element in order to preload the pair of restoring elements in opposite directions in the inactive position. If the restoring elements are in the form of leaf springs, bending of the leaf springs in different directions results in the inactive position.

In one embodiment of the present invention, the position of the at least one movable force application point at the flyweight with respect to the associated restoring element in the inactive position of the torsional vibration damping arrangement can be asymmetrical, i.e., not mirror-symmetrical or axially symmetrical. This can be achieved, for example, in that only exactly one force application point which is movable in radial direction in or at the flyweight is associated with each restoring element of the torsional vibration damping arrangement. In this respect, the respective force application points of the first restoring element and second restoring element of the pair can be arranged on different respective sides of the associated restoring elements. Thus while the force application point for a first restoring element is located in counterclockwise direction, the force application point of the second restoring element is arranged clockwise with respect to the second restoring element. According to one embodiment, deflection mass pendulum units associated with the first restoring element and second restoring element arranged alternately or oppositely in circumferential direction so that the different preloading forces in the inactive position add to zero.

In one embodiment, two force application points, which are movable in radial direction, can be associated with each restoring element, wherein the two force application points can move up and down radially under centrifugal force opposite to one another on different sides of the respective restoring element, and wherein the two force application points are arranged asymmetrically with respect to the respective restoring element in the inactive position. This means, for example, that the restoring element on one side in the inactive position is in direct contact with a first force application point, while there is play in circumferential direction (circumferential play) on the other side between the restoring element and a second force application point. Accordingly, the two force application points are located at different distances from the restoring element, where one distance is zero and the other distance is greater than zero. In one embodiment, it can be provided further that the asymmetrical arrangement of two first force application points with respect to the first restoring element is the inverse of the asymmetrical arrangement of two second force application points with respect to the second restoring element. Compared to other possible examples, a construction of the adjusting system of the torsional vibration damping arrangement with alternately actuated restoring elements which are preloaded to come closest to an ideal stiffness characteristic curve (free from play) with the quantity of restoring elements remaining the same.

By means of asymmetrical arrangement of the force application points, formed, e.g., by pin elements in the flyweight such that a deflection or bending of the restoring element takes place in the zero position (inactive position) or selectively through asymmetrical arrangement of the restoring elements relative to the flyweight or through asymmetrical arrangement of the flyweights (guide path of the flyweights) relative to the restoring elements, or a combination of the different possibilities, a mutual preloading of the restoring elements can be realized and tolerance-dependent play in the system can be eliminated.

By an asymmetrical construction of the flyweight, the rest of the vibration absorber or torsional vibration damping arrangement, e.g., retainer elements for the restoring elements and guide paths of the flyweights, can be constructed symmetrically, and the mutual preloading can be generated only by alternating installation of the inversely asymmetrical flyweights. In this respect, the center of gravity of the flyweight can be influenced in the most favorable possible manner for radial adjustment at speed by means of constructional steps, e.g., balance bores.

Accordingly, in one embodiment of the torsional vibration damping arrangement, the first restoring element and the second restoring element are arranged relative to at least one, preferably exactly one, of the force application points associated therewith without circumferential movement play. In other words, there is direct contact between restoring element and at least one force application point which is formed, for example, by a circumferential supporting region of a flyweight.

According to one embodiment of the present invention, a drivetrain for a vehicle is provided that comprises at least one torsional vibration damping arrangement.

Further advantageous embodiments and further developments are indicated in the dependent patent claims and in the following detailed description.

BRIEF DESCRIPTION OF THE DRAWINGS

Embodiment examples of the present invention will be described more fully in the following with reference to the accompanying drawings. The drawings show:

FIGS. 5a, 5b two longitudinal sectional views of an annularly formed deflection mass in different section planes;

FIG. 7 is a detail of a deflection mass pendulum unit;

FIG. 8 is a view of a supporting element of the deflection mass pendulum unit viewed from the radially outer side;

FIG. 9 is a perspective view of the supporting element from FIG. 8;

FIG. 10 is a side view of the supporting element from FIG. 8;

FIG. 11 is the supporting element from FIG. 8 in section along a line XI-XI in FIG. 10;

FIG. 23a, 23b are a pair of preloaded restoring elements actuated or controlled on one side;

FIG. 24a, 24b are a pair of alternately actuated or controlled preloaded restoring elements;

DETAILED DESCRIPTION OF THE PRESENTLY PREFERRED EMBODIMENTS

Figure 1:
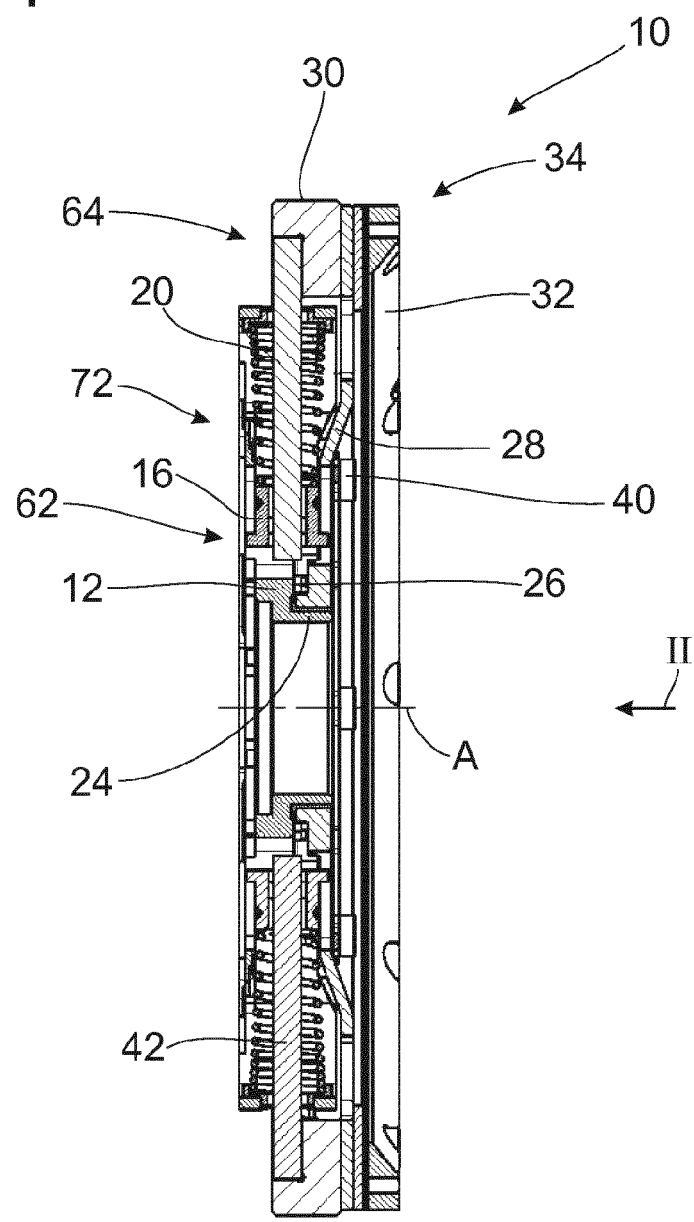
FIG. 1 is a longitudinal sectional view of a torsional vibration damping arrangement.

In the following description, components which function identically or similarly are denoted by identical reference numerals.

Figure 2:
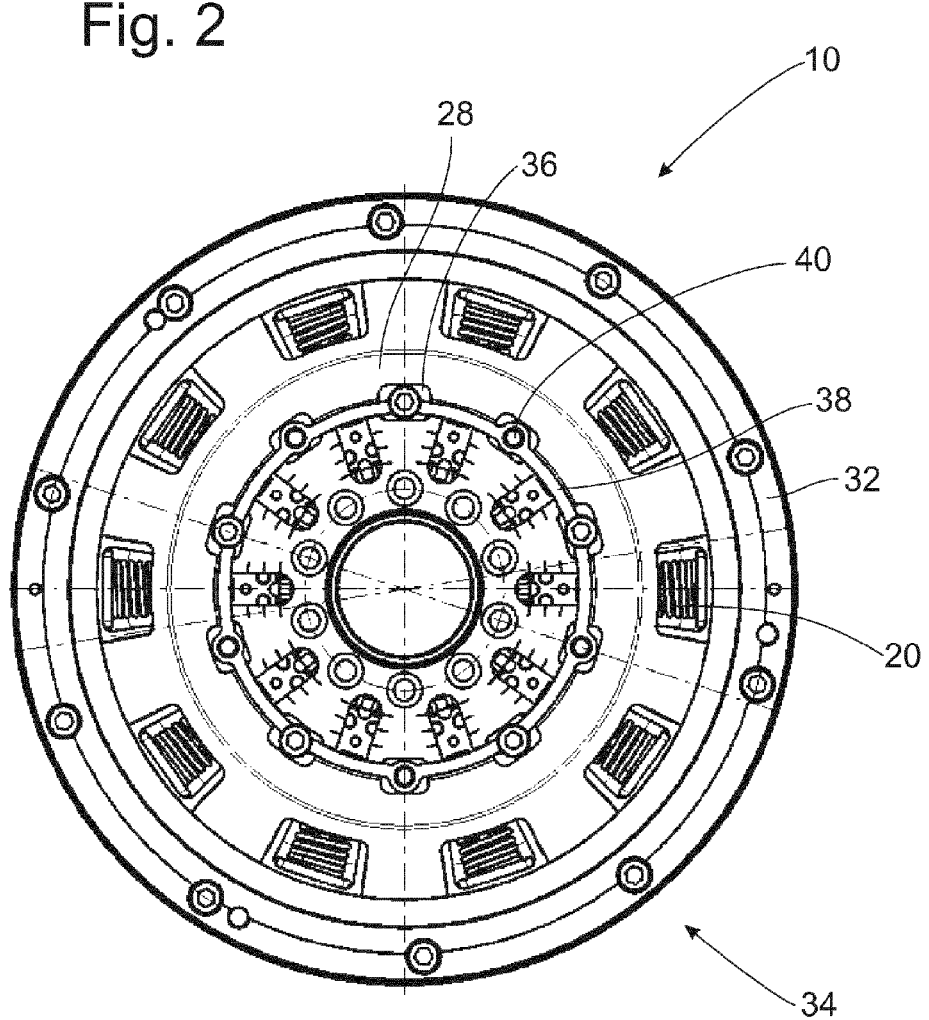
FIG. 2 is an axial view of the torsional vibration damping arrangement from FIG. 1 in viewing direction II in FIG. 1.
Figure 3:
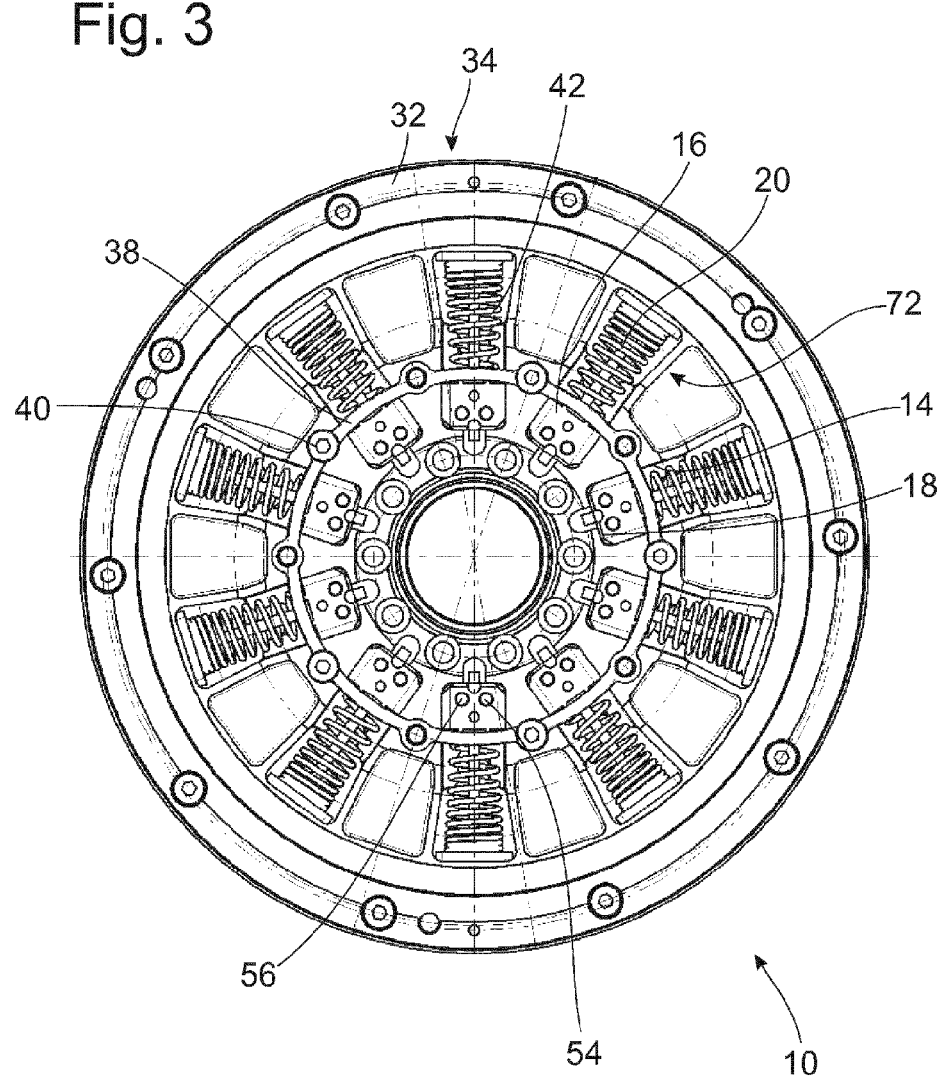
FIG. 3 is a view corresponding to FIG. 2 in which a carrier disk of an annularly formed deflection mass is omitted.
Figure 4:
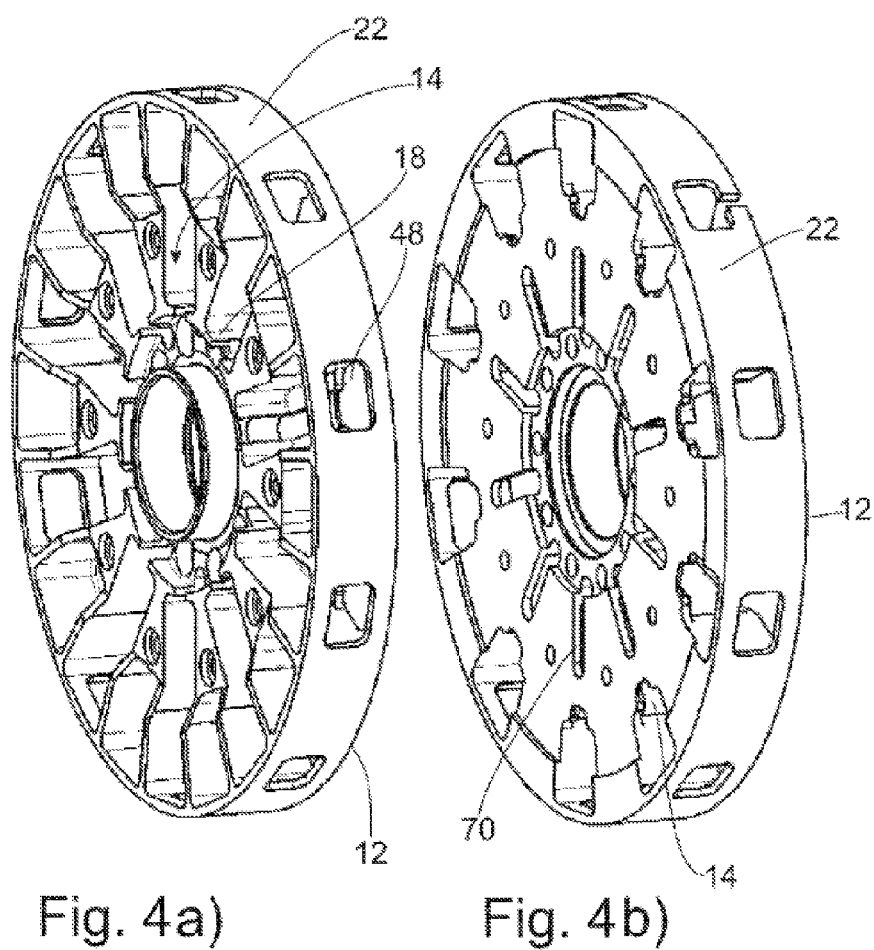
FIGS. 4a, 4b are two perspective views of a carrier of the torsional vibration damping arrangement from FIG. 1 viewed from different sides.

FIGS. 1 to 3 show a torsional vibration damping arrangement, designated generally by 10, which can be integrated in or coupled with a drivetrain of a vehicle to perform the functionality of a speed-adaptive mass damper. The torsional vibration damping arrangement 10 comprises a carrier arrangement 12, which is to be fastened by screws to a drivetrain component for rotating therewith around an axis of rotation A. In the views shown in FIGS. 3 and 4, guides 14 are provided in this carrier arrangement or carrier 12 preferably approximately circumferentially equidistant at a plurality of circumferential positions, flyweights, also referred to hereinafter as supporting elements 16, being received in these guides 14 so as to be radially movable. The guides 14 are formed as substantially radially extending, elongated cutouts limited radially inwardly by stops 18 defining a radially inner basic position of the flyweights 16. The flyweights 16 can be held in a preloaded manner in contact with the stops 18 radially inwardly, i.e., in the basic position, by preloading springs 20 formed as compression coil springs. To this end, the preloading springs 20 can be supported at a radially outer annular edge region 22 of the carrier 12.

Figures 5, 6:
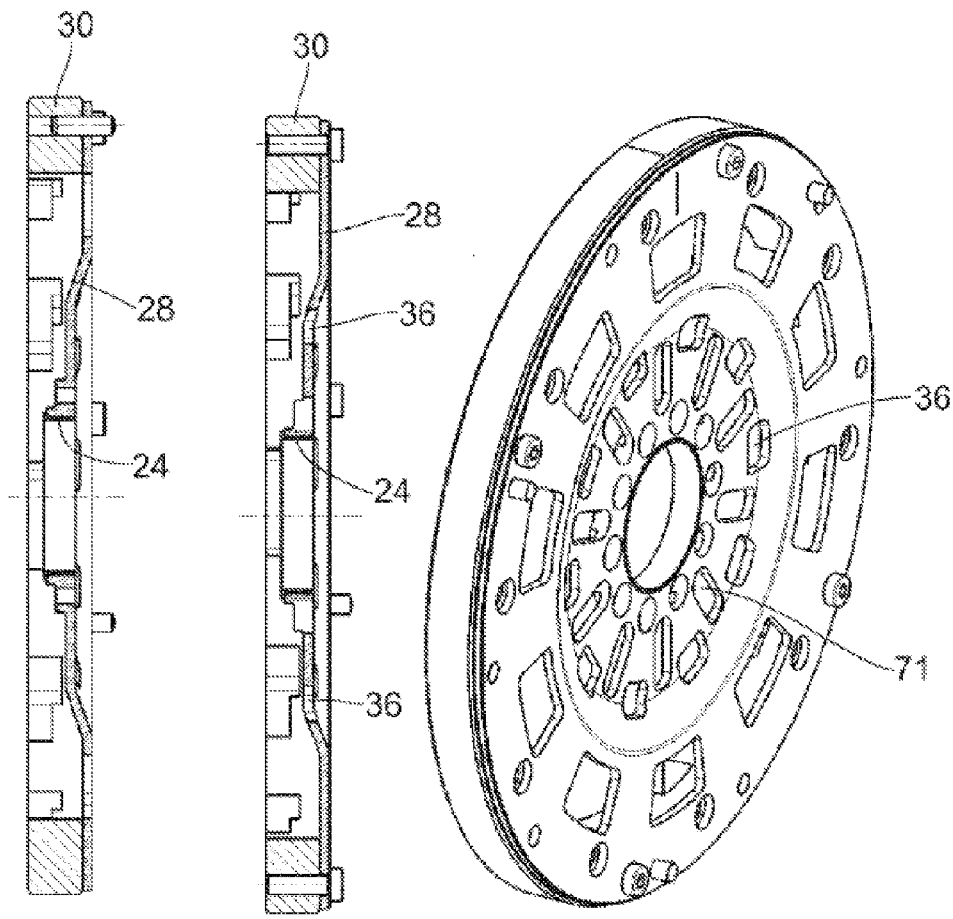
FIG. 6 is a perspective view of the annularly formed deflection mass.

A carrier disk 28 is supported at the carrier 12 via a radial bearing 24 and an axial bearing 26 so as to be basically rotatable around the axis of rotation A with respect to the carrier 12. In its radially outer region, the carrier disk 28 can carry a mass ring 30 by screw connection at an axial side. A further mass ring 32 can be fastened to the other axial side of the carrier disk 28. Together with the mass ring 30 and possibly also mass ring 32, the carrier disk 28 forms a deflection mass or pendulum mass, designated generally by 34, which can oscillate in circumferential direction (i.e., tangential direction) around the carrier arrangement 12 in order to damp torsional vibrations. The carrier disk 28 and, therefore, the deflection mass 34 can be axially secured to the carrier 12 by means of a plurality of bolts 40, also shown in FIG. 6, for example, threaded bolts, which pass through cutouts 36 elongated in circumferential direction and which hold an axial retaining ring 38 at the side of the carrier disk 28 remote of the carrier 12. Because of the circumferential movement play of the bolts 40 in the cutouts 36 of the carrier disk 28, the deflection mass 34 is rotatable around the axis of rotation A in corresponding circumferential movement play with respect to the carrier 12 such that bolts 40 and cutouts 36 cooperate to limit relative rotational angle.

The deflection mass arrangement 34 is coupled with the carrier 12 for power transmission by a plurality of circumferentially successive, substantially radially extending springs or restoring elements 42. These restoring elements 42, which are formed in this case as leaf springs or generally as bending beams, can be fastened in their radially outer area 44 to the mass ring 30 by a respective clamping arrangement 46. Proceeding from this fastening, they extend radially inward through openings 48 in the edge region 22 of the carrier arrangement 12 into a respective preloading spring 20 for radial preloading of the flyweights 16.

As is illustrated in FIG. 7, the restoring element 42, or every restoring element 42, projects by its radially inner end region 50 into and through a central aperture 52 of an associated flyweight or flymass 16. In the region of aperture 52, two circumferential supporting regions 58, 60 are provided, for example, at pins or bolts 54, 56, spaced apart laterally from one another at the flyweight 16 and form radially displaceable force application points around which an associated restoring element 42 can deform. Mass 34 oscillates around the axis of rotation A. These circumferential supporting regions or force application points 58, 60, which can be located on both sides of the radially inner end region 50 of the associated restoring element 42 in circumferential direction, but asymmetrically with respect to the latter, define in their entirety a carrier supporting region 62, whereas a deflection mass supporting region 64 is formed in the region in which the radially outer end region 44 of the restoring element 42 is secured to the mass ring 32 or, generally, to the deflection mass 34.

As will be shown in the following, the restoring element 42 can be received in a preloaded manner between the two force application points or abutments 58, 60 without movement play, at least on one side, to allow a low-friction radial movement of the supporting element 16 in the associated guide 14 in the carrier 12 occurring under centrifugal force. To protect the preloading spring 20, the supporting element 16 can have two axially oriented lateral guide projections 66, 68 which extend into associated, substantially radially extending guide cutouts 70, 71 of the carrier 12 and of the carrier disk 28, respectively, and which can be radially movably guided and received therein and form a radial stop. Cutouts 71 can have a greater circumferential width than the cutouts 70 in the carrier 12 so as not to impair the relative rotation of the carrier disk 28 with respect to the carrier 12, particularly by interaction of the guide projection 68 with the carrier disk 28. Further, a tilting of a supporting element 16 occurring under centrifugal force can be prevented in that the center of mass M of the supporting element 16 is approximately centrally located in the aperture 52.

In the torsional vibration damping arrangement 10 having the constructional design mentioned above with reference to FIGS. 1 to 11, a flyweight or supporting element 16, which is radially movably guided in the carrier 12, the restoring element 42 or vibration absorber spring 42 cooperating with the latter, the preloading spring 20, which preloads the flyweight 16 radially inward into the basic position thereof which is shown in FIG. 7, in the inactive position of the torsional vibration damping arrangement without deflection in circumferential direction, and the deflection mass 34 respectively form a deflection mass pendulum unit 72. In the depicted embodiment form, merely by way of example, a total of ten such deflection mass pendulum units 72 are provided, wherein the carrier 12 is a shared carrier for the supporting elements 16 of all of the deflection mass pendulum units 72, and the deflection mass 34 is a shared deflection mass for all of the deflection mass pendulum units 72. However, the principles of the present invention could basically also be realized when a separate and independent carrier is provided in association with each deflection mass pendulum unit 72 or at least with some of the deflection mass pendulum units 72 and/or when an independent deflection mass is provided in association with all of the deflection mass pendulum units 72 or with some of the deflection mass pendulum units 72. However, for reasons of stability and to prevent unwanted vibration states or to obtain a synchronous vibration behavior of all of the deflection mass pendulum units 72, it is advantageous at least to combine all of the deflection masses in a common annular deflection mass 34.

Figure 12:
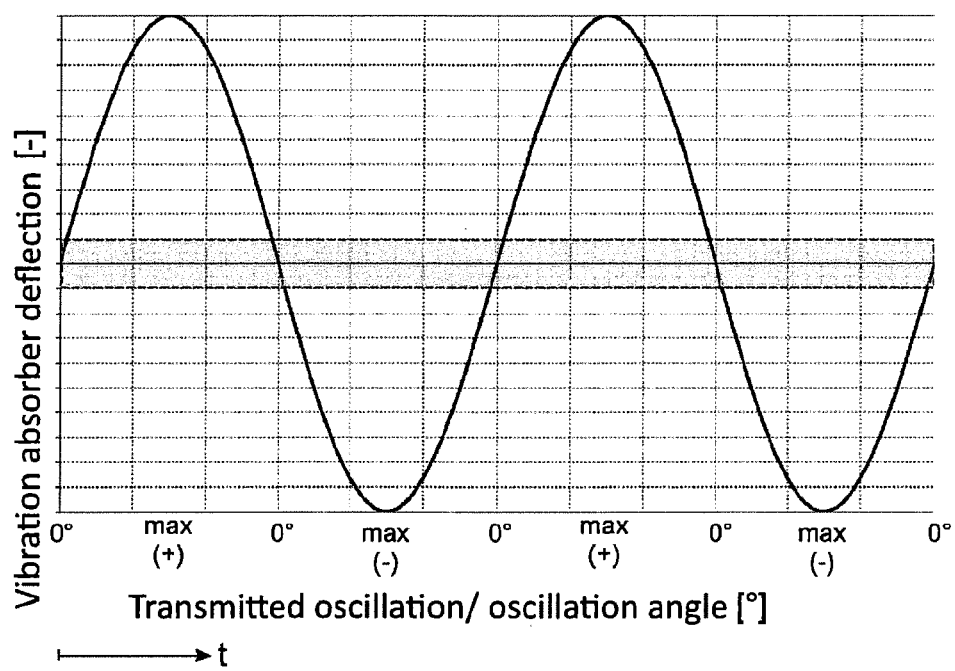
FIG. 12 is a graph of periodic deflection of a deflection mass of the torsional vibration damping arrangement with restoring elements supported on both sides.

FIG. 12 shows the periodic vibration behavior of the pendulum mass or deflection mass 34, designated generally in FIG. 12 as vibration absorber deflection, plotted over time or over a transmitted (torsional) vibration. A gray-shaded deflection region is shown in the zero crossing area. This is the region which would be obtained if the flexible restoring elements 42 were received with play between the associated circumferential supporting regions 58, 60 or pins 54, 56 as is shown in an exemplary manner in FIG. 13.

During periodic deflection of the deflection mass 34 and corresponding back-and-forth deformation, i.e., bending, of the restoring elements 42 in circumferential direction, a condition in which there is no force transmission between the carrier 12 and the deflection mass 34 would always occur for a short time at the zero crossing of the vibration absorber deflection, i.e., in the basic relative position between carrier 12 and deflection mass 34 in which the restoring elements 42 are not compressed because of circumferential play, due to the radial inner end region 50 of the restoring elements 42 being received with play between the circumferential supporting regions 58, 60. In this condition, the restoring elements 42 do not load the associated supporting elements 16 in circumferential direction because of the play or air between restoring element 42 and force application point(s) 58, 60, so that there can occur a radial displacement of the supporting elements or sliding blocks 16 which is largely unencumbered by loads of this type and by frictional effects brought about by these loads. This displaceability of the sliding blocks (or flyweights) 16 is unimpaired as far as possible by frictional effects and can also be supported in principle in that the torsional vibration damping arrangement 10 is received in a housing which is filled or fillable with fluid, e.g., oil. As a result of this, the supporting elements 16 undergo a lubricating effect with respect to the carrier 12 and also with respect to the associated restoring elements 42 and can therefore be displaced more easily under centrifugal load.

Figure 13:
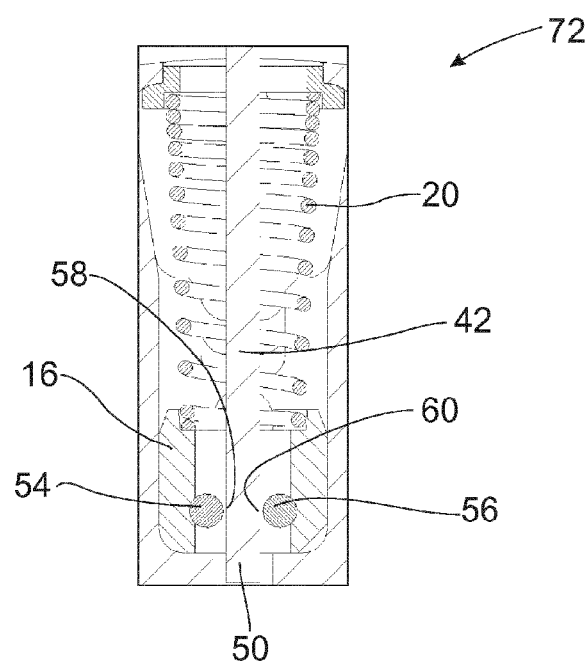
FIG. 13 is a deflection mass pendulum unit with force application points arranged around a restoring element on both sides with play.
Figure 15:
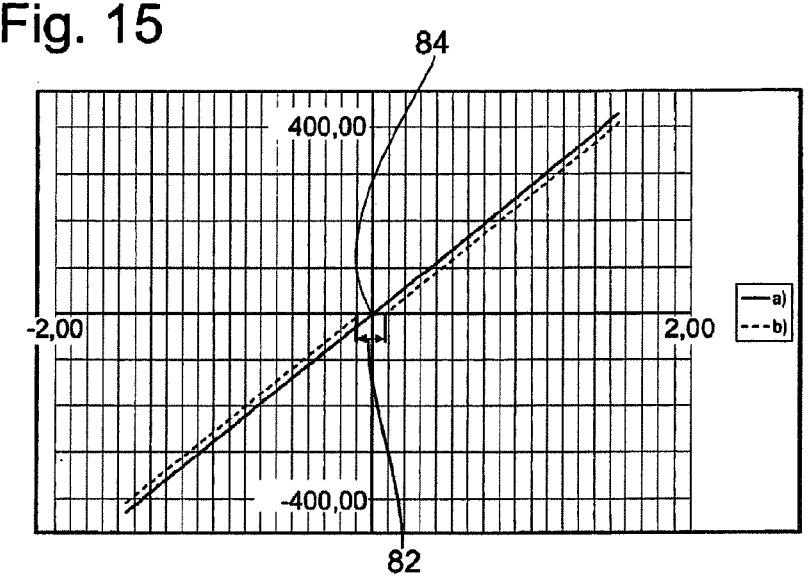
FIG. 15 is a graph of comparison of stiffness characteristic curves for alternating actuation according to FIGS. 13 and 14, with and without play.

Accordingly, the deflection mass pendulum unit 72 shown in FIG. 13 has design circumferential play between the restoring element 42 and the pin, or other embodiment of linear engagement elements 54, 56 of the supporting element 16, cooperating with the restoring element 42. The corresponding restoring element characteristic or spring characteristic is shown by curve b) in FIG. 15. In this regard, the (circumferential) play manifests itself in the form of a force-free condition in region 82 of the alternating contact of the restoring elements 42. In this region 82, disregarding friction forces, the supporting elements or flyweights 16 can displace radially virtually without friction. This variant with play is advantageous with respect to simplicity of construction (carry-over parts, no compulsory orientations in assembly). On the one hand, in accordance with the production tolerance chain, the play in the adjusting system must be sufficiently large to prevent jamming of the displaceable parts in every case. On the other hand, high process capabilities of the production machinery and a testing of adjustability are necessary to minimize play as far as possible.

The circumferential play should be as minimal as possible so as to influence the vibration absorber stiffness as little as possible, since an aggregate stiffness is reduced by play, which has a great influence above all at small oscillating angles. In other words, from this perspective of aggregate stiffness, a construction of the deflection mass pendulum unit 72 according to FIG. 14, which represents the ideal condition (no play) in the actuation of the bending springs 42, is desirable. The associated characteristic or spring characteristic curve is shown in curve a) in FIG. 15. However, from a technical view point with respect to manufacture, this play-free condition is impossible or very difficult (process capability) to realize or can only be realized by additional steps (mechanisms for compensation of tolerances). Moreover, the ideal play-free actuation according to FIG. 14 conflicts with the smooth running of the adjusting system of the deflection mass pendulum unit 72. In this context, "play-free" always implies a certain friction component which negatively influence the reaction speed of the adjusting system during changes in speed. In theory, only the load-free conditions are available for an adjustment of the flyweights 16 under centrifugal force with negligible friction forces and, in this case, these load-free conditions are present only at the exact moment 84 of the change of contact of the bending springs 42 from pull to push or vice versa.

Figure 16:
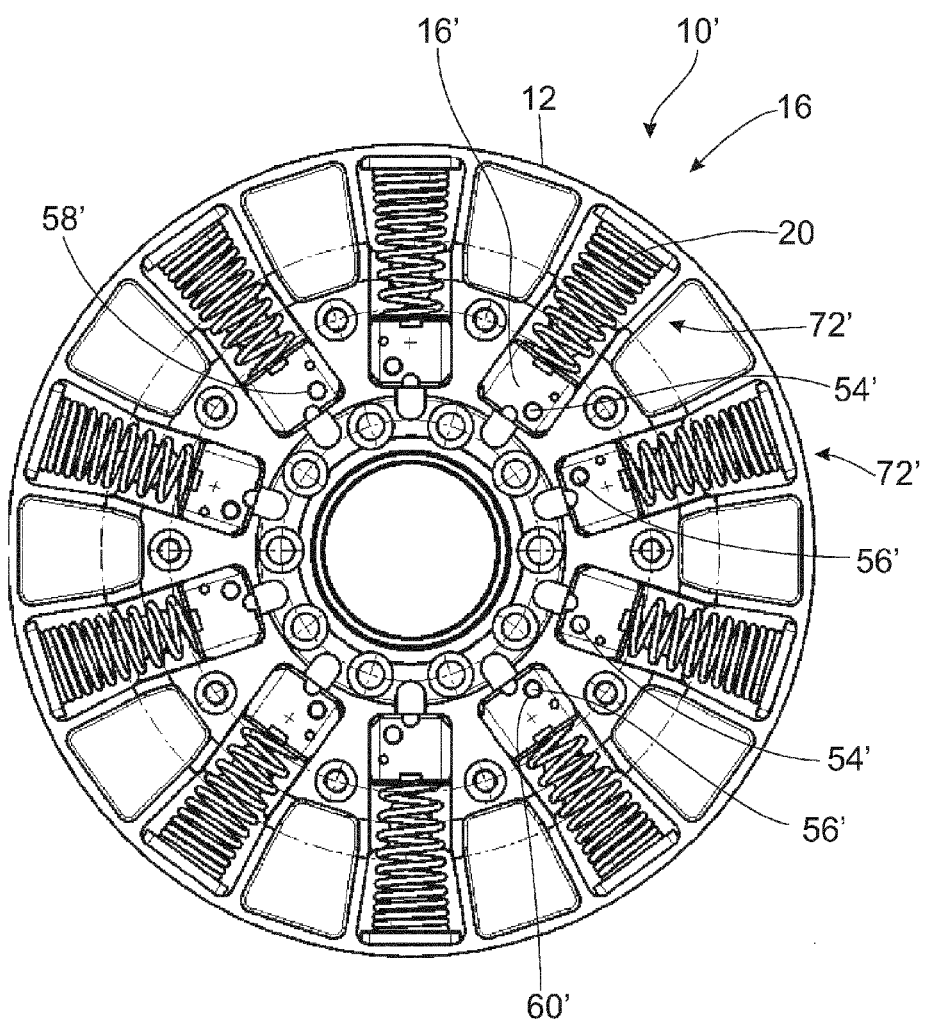
FIG. 16 is a view corresponding to FIG. 3 of a mode of construction modified particularly in the region of the supporting elements.
Figure 17:
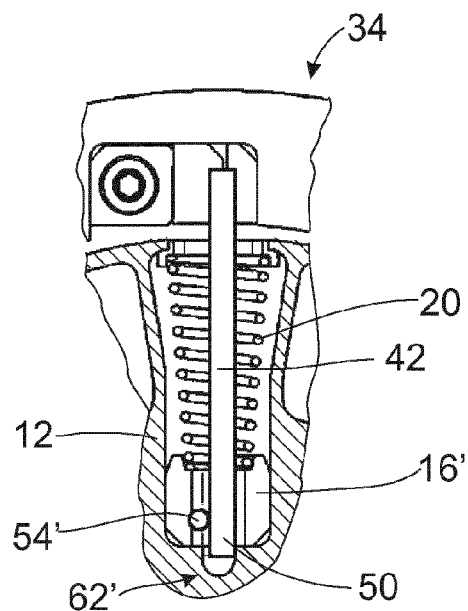
FIG. 17 is an enlarged detail of a deflection mass pendulum unit of the torsional vibration damping arrangement of FIG. 16.
Figure 18:
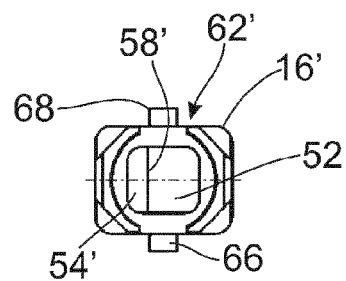
FIG. 18 is a supporting element of the deflection mass pendulum unit of FIG. 17 viewed from the radially outer side.
Figure 19:
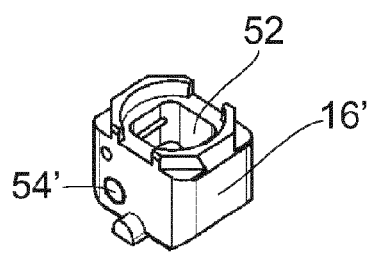
FIG. 19 is a perspective view of the supporting element of FIG. 18.
Figure 20:
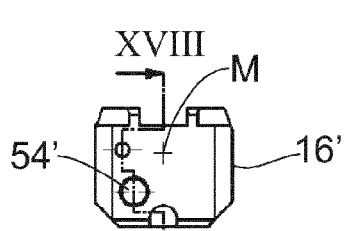
FIG. 20 is a side view of the supporting element of FIG. 18.
Figure 21:
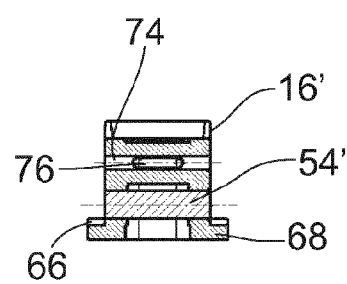
FIG. 21 is the supporting element of FIG. 18 in section along a line XVIII-XVIII in FIG. 20.

An embodiment form, which is modified asymmetrically particularly with respect to the construction of the supporting elements or sliding blocks 16, is shown in FIGS. 16 to 22 and is described with reference to these figures. The basic construction corresponds to the preceding description so that reference may be had to the relevant statements made above. It can be seen particularly from FIGS. 17 to 21 that only one pin or bolt 54' or 56' can be provided in the supporting elements or sliding blocks or flyweights 16' shown here and, accordingly, also only one force application point or oscillating point 58', 60' can be provided at the carrier supporting region 62' (→asymmetry). Accordingly, the restoring element 42 can be supported in the carrier supporting region 62' in only one circumferential direction. As is shown in FIG. 16, the overall construction can be carried out such that, alternately, in the circumferentially successive deflection mass pendulum units 72', pin 54' is first provided for furnishing a force application point in a first circumferential direction and, in the subsequent deflection mass pendulum unit 72', pin 56' is then provided so that a force application point can be realized therein in a second, opposite circumferential direction, i.e., on the other side of the restoring element. As a result, only half of the restoring elements of all of the deflection mass pendulum units 72' is operative during each half-oscillation, which halves the total stiffness of the torsional vibration damping arrangement 10'.

It should be noted that the circumferential sequence of deflection mass pendulum units 72', which differ in this way, need not necessarily be alternating in the manner depicted in FIG. 16. A plurality of deflection mass pendulum units 72' of basically identical construction, i.e., with supporting functionality in the same circumferential direction, could also be arranged successively in each instance. However, for reasons of symmetry and to prevent unbalance, the alternating arrangement shown in FIG. 16 is particularly advantageous.

In an advantageous manner, the center of mass M can also be centrally disposed in the aperture 52 in this case also so that a centrifugal force-induced tilting of the supporting elements 16' is also prevented in this embodiment. To achieve this, one or more bore holes or openings 74 and possibly mass elements inserted therein (see FIG. 21) can be provided to compensate for the additional mass of a respective pin or bolt 54' or 56' in the supporting element 16'.

Figure 22:
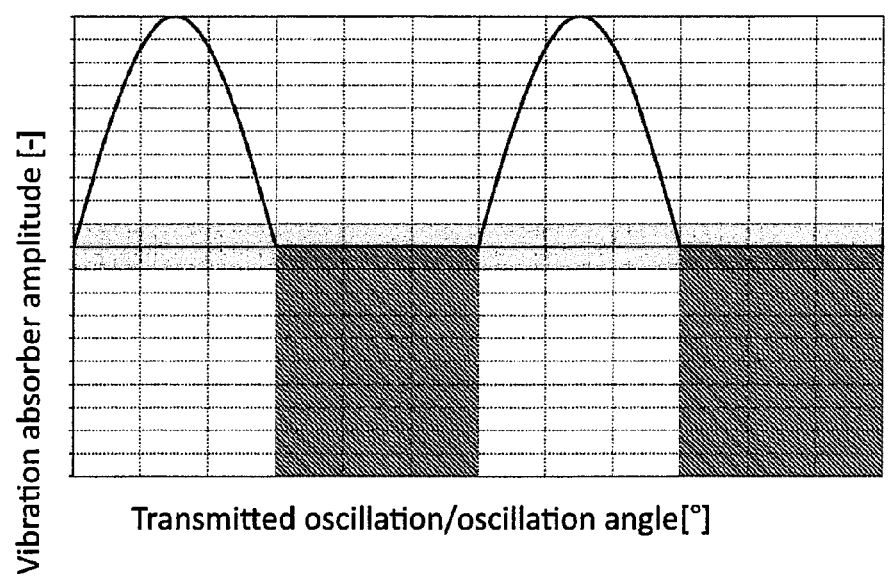
FIG. 22 is a graph of periodic deflection of a deflection mass with restoring elements supported at one side.

The functioning of a deflection mass pendulum unit 72' constructed in this way with alternate actuation of the restoring elements 42 is illustrated in FIG. 22. It will be seen that this deflection mass pendulum unit 72' is only operative during half-oscillations for generating a restoring force. Through the cooperation of a plurality of differently configured deflection mass pendulum units 72', i.e., with force application points on different sides, a restoring force functionality can be achieved over the entire course of the oscillation. In FIG. 22 also, a gray-filled region is shown close to the zero crossing of the vibration absorber deflection. In principle, the provided pin or force application point in the zero crossing or inactive condition could also have a short circumferential distance (i.e., circumferential clearance) from the associated restoring element 42 in this case. However, according to one embodiment, clearance of this kind could also be dispensed with, as is shown in FIG. 23, in view of the fact that whenever a restoring element 42 is in a non-operative oscillation phase with respect to the deflection mass pendulum unit 72', the radially inner end region 50 of the restoring element 42 lifts from the sole circumferential supporting region at hand.

FIG. 23 shows a pair of two complementary deflection mass pendulum units 72' according to one embodiment. The pair comprises a first restoring element 42 (e.g., on the left-hand side) which is preloaded in a first direction in inactive position of the torsional vibration damping arrangement 10 (or at the zero crossing of the vibration absorber deflection) and a second restoring element 42 (e.g., on the right-hand side) which is preloaded in the inactive position in a second direction opposite to the first direction as is indicated by the differently oriented arrows. The different preloading or bending of the two restoring elements 42 of the pair is preferably selected such that opposed preloading forces resulting from the opposed preloading are identical in amount in the inactive position or zero crossing.

It can be seen that the first restoring element or first flexible spring 42 (on the left-hand side) is preloaded in the first direction in inactive position of the torsional vibration damping arrangement 10' by direct contact with a force application point 58' (at the pin 54') associated with the first restoring element 42, and that the second restoring element 42 (right-hand side) is preloaded in the second direction in inactive position (i.e., no deflection) by direct contact with a force application point 60' (at pin 56') associated with the second restoring element 42. In other words, the two restoring elements 42 forming an associated pair of restoring elements also directly contact their respective force application points 58' and 60', respectively, in the inactive position. Therefore, according to one embodiment, there can be a respective preloading or bending of the restoring elements 42 in a range of from 1% to 10% of a maximum bending of a restoring element 42, e.g., a leaf spring, in the inactive position of the torsional vibration damping arrangement 10.

The embodiment illustrated in FIG. 23 shows a first flyweight 16' movable in radial direction along the first restoring element 42 (left) and a second flyweight 16' movable in radial direction along the second restoring element 42 (right). The flyweights or sliding blocks 16' are in direct pressing contact with the first restoring element 42 and second restoring element 42 on different sides of the restoring element 42, namely, alternately on the left-hand side or counterclockwise (contact point 58') and on the right-hand side or clockwise (contact point 60'), in order to preload the pair of restoring elements 42 in opposite directions in the inactive position of the torsional vibration damping arrangement 10'. As shown in FIG. 23, exactly one force application point 58' (left) and 60' (right) which is movable in radial direction is associated with each of the two restoring elements 42. The respective force application points 58', 60' of the first restoring element 42 and second restoring element 42 are arranged on different sides of the restoring elements 42 to achieve the opposed preloading.

FIG. 23 shows a one-sided actuation of the restoring elements or leaf springs 42. An alternating arrangement of restoring elements 42 in pairs is preferably used in this embodiment. In other words, the first restoring element 42 and second restoring element 42 form a pair of restoring elements or deflection mass pendulum units 72' arranged adjacent to or opposite one another in circumferential direction. The torsional vibration damping arrangement 10' has a plurality of pairs arranged in circumferential direction. In FIG. 16, for example, there are five pairs of deflection mass pendulum units 72', each with alternate or opposed preloading such that the preloadings add to zero.

Figure 25:
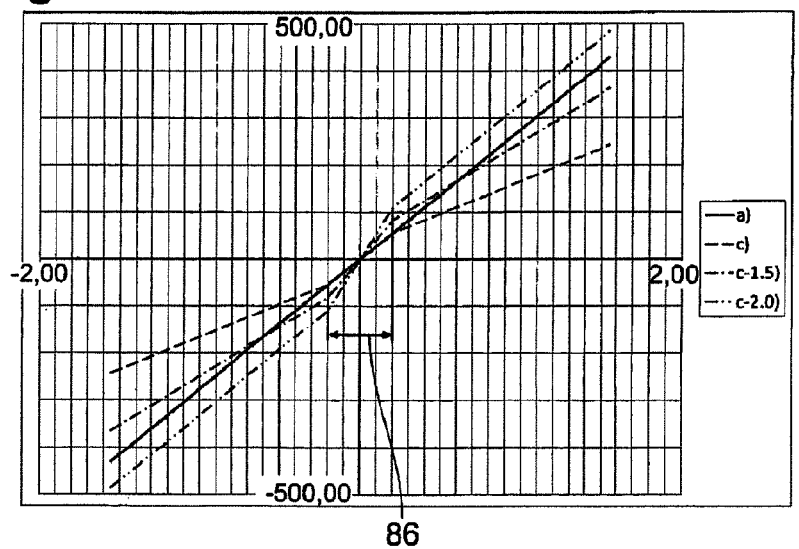
FIG. 25 is a graph of comparison of stiffness characteristic curves for alternate and one-sided actuation of restoring elements.

Assuming an identical quantity of restoring elements 42 in each instance, mutual or opposite preloading of the restoring elements 42 gives a vibration absorber characteristic as shown in curve c) in FIG. 25. Shown in preloading region 86 is an ideal characteristic curve shape (see curve a) which drops to half-stiffness when the bending of the restoring element is greater than the preloading because, in this case, only one half of all of the restoring elements 42 of the torsional vibration damping arrangement 10' is active. In the region outside of the preloading, the adjusting system of the restoring elements 42, which are no longer engaging can adjust free from load. In FIG. 25, curves c-1.5 and c-2.0 show the shape of the vibration absorber characteristic curve for 1.5 times and 2.0 times the quantity of restoring elements 42, respectively, compared to curve c).

Figure 14:
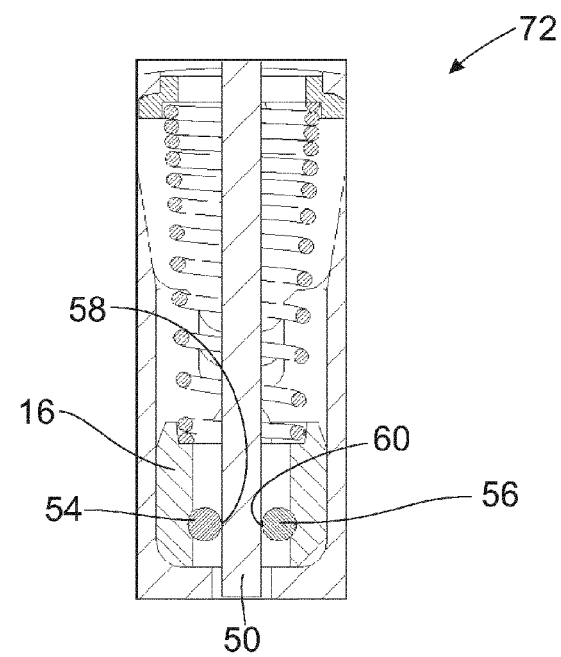
FIG. 14 is a deflection mass pendulum unit with force application points arranged around a restoring element alternately with play.

In the arrangement according to FIG. 16 and FIG. 23, the differently preloaded restoring elements 42 are dynamically loaded and are accordingly better off with respect to service life compared to an alternating load such as was described by way of example referring to FIGS. 13 and 14. Accordingly, compared to alternating load with two force application points 58, 60 per restoring element 42, higher stresses or bending and, therefore, larger oscillating angles can be permitted. If the tuning (spring stiffness) of the vibration absorber is configured such that, in contrast, one half of the quantity of active restoring elements 42 is sufficient or if the restoring elements 42 are differently dimensioned in a corresponding manner such that the half-quantity of active springs provides the same stiffness as in an arrangement according to FIG. 14 (see FIG. 23, curve a) as ideal stiffness), the aggregate stiffness is twice as great at small oscillating angles (less than or equal to the preloading angle) and decreases at oscillating angles greater than the preloading angle with angles increasing in direction of design stiffness. In theory, design stiffness is never attained but will always be somewhat exceeded. This effect can be advantageous at higher speeds, when the oscillating angles are small and a radial end of the adjusting region of the flyweights 16 is reached, the order can still be maintained for a certain speed range before it drops below the tuning order. At low speeds, the exciting torques are empirically highest so that the torsional vibration damping arrangement 10' executes large oscillating angles and the aggregate stiffness accordingly corresponds approximately to design. Since there is no ideal clamping for the restoring elements 42, the theoretical stiffness of the restoring elements 42 can never be achieved in practice, but will always be somewhat lower. Since the aggregate stiffness always lies somewhat above the theoretical design stiffness in the present embodiment, this can have a compensating effect.

While the embodiments described referring to FIGS. 16 to 23 are characterized in that exactly one force application point 58' or 60' movable in radial direction is associated with each restoring element 42 of the torsional vibration damping arrangement 10', wherein the respective force application points of the first restoring element 42 and second restoring element 42 are arranged on different sides of the restoring elements 42 to achieve the opposed preloadings, further embodiments also provide other asymmetrical arrangements of force application points around a restoring element 42.

By way of example, FIG. 24 shows an embodiment in which two force application points 58, 60 which are movable in radial direction are associated with each restoring element 42 of a torsional vibration damping arrangement 10. Here also, a first restoring element 42 (e.g., left-hand side) is preloaded in a first direction in the inactive position of the torsional vibration damping arrangement 10, while a second restoring element 42 (right-hand side) is preloaded in a second direction opposed to the first direction (see arrows) in the inactive position. Here also, the opposed preloading can again be achieved through direct contact of the restoring element 42 with one of its two associated force application points 58, 60.

In this case, as in the examples described referring to FIGS. 1 to 4, the two force application points 58, 60 move radially outward and inward, respectively, opposite one another on different sides (left, right) of the respective restoring element 42 under centrifugal force. In contrast to the torsional vibration arrangements 10 described above, the two force application point 58, 60 in FIG. 24 are both arranged asymmetrically with respect to their respective restoring element 42 in the inactive position (i.e., no deflection of the deflection mass 34) to achieve the opposed preloadings. In other words, in the left-hand deflection mass pendulum unit 72 of the pair of deflection mass pendulum units 72 shown in FIG. 24, the restoring element 42 directly contacts the left-hand pin 54 or force application point 58 of the left-hand flyweight 16 in the inactive position. On the other hand, there is circumferential play between the left-hand restoring element 42 and the right-hand pin 56 or force application point 58 of the left-hand flyweight 16. The situation in the right-hand deflection mass pendulum unit 72 is exactly the inverse, i.e., the right-hand restoring element 42 directly contacts the right-hand pin 56 or force application point 60 of the right-hand flyweight 16 in the inactive position. There is circumferential play between the right-hand restoring element 42 and the left-hand contact pin 54 or force application point 58 of the right-hand flyweight 16. Accordingly, according to the embodiment of FIG. 24, the asymmetrical arrangement of two first force application points 58, 60 with respect to the first restoring element 42 (left-hand side) is the inverse of the asymmetrical arrangement of two second force application points 58, 60 with respect to the second restoring element 42 (right-hand side).

It is to be noted here also that the circumferential sequence of deflection mass pendulum units 72, which differ in the way described above, need not necessarily be alternating as is indicated in FIG. 24. A plurality of deflection mass pendulum units 72 with basically the same construction, i.e., supporting functionality in the same circumferential direction, could also be arranged successively. However, for reasons of symmetry and to prevent unbalance, the alternating arrangement shown in FIG. 24 is particularly advantageous.

Figure 26:
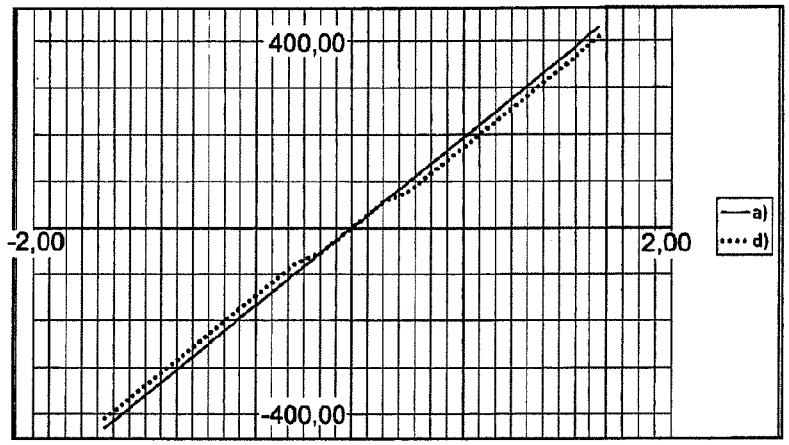
FIG. 26 is a graph of comparison of stiffness characteristic curves for alternate actuation of restoring elements, without play and with play, but mutually preloaded.

In the alternating actuation (control) of the restoring elements 42 according to FIG. 24, which have play but are mutually preloaded, each restoring element 42 can be actuated alternately via the force application points 58, 60 which are asymmetrically situated with respect to the restoring element 42 and can therefore be utilized efficiently. In this case also, the mutual preloading of the restoring elements 42 in pairs allows a play-free zero crossing with ideal characteristic curve shape which has the same shape as curve c) in FIG. 25 (or curve c) in FIG. 27) even when the preloading is exceeded, giving on the whole a characteristic curve shape according to curve d) in FIG. 26 or FIG. 27. After the restoring elements 42 executing a change of contact run through the play in the adjusting system, the characteristic curve proceeds with the same slope as before, but so as to be offset parallel to the ideal characteristic curve according to curve d) in FIG. 26 or FIG. 27. In this case, the load-free region can be determined via the play relative to one of the two force application points 58, 60. The characteristic curve shape of this variant according to FIG. 24 is shown in curve d) in FIG. 26. The more efficient utilization of the restoring elements 42 (alternating) which makes it possible to economize on components and the virtually ideal characteristic curve shape are particularly advantageous. Compared to curve a) in FIG. 15, the zero crossing in this case is without play so that the aggregate stiffness of the torsional vibration damper is not affected at oscillating angles smaller than preloading angles and is affected only minimally at oscillating angles greater than the preloading angle. If the configuration is selectively configured somewhat stiffer, the stiffness losses described above can be compensated by the clamping of the restoring elements 42 and the lower level of stiffness in the aggregate stiffness compared to the ideal stiffness.

To summarize, the position of at least one movable force application point at the flyweight is asymmetrical with respect to the restoring element cooperating with it in the inactive position or in the zero crossing. In particular, the radially extending restoring element 42, e.g., a leaf spring, cannot be regarded as axis of symmetry of the force application points. The asymmetry can be achieved by an asymmetrical arrangement of the pin elements 54, 56 in the flyweight 16 in such a way that a deflection of the restoring elements takes place in the zero position. Alternatively, the restoring elements 42 can be positioned in an asymmetrical manner relative to the flyweight or flyweights (guide path of the flyweights). A mutual preloading of the restoring elements 42 can also be realized through a combination of the different possibilities, and tolerance-dependent play in the system can be eliminated.

In one embodiment, the first restoring element 42 and the second restoring element 42 of a cooperating pair are arranged relative to at least one of, preferably exactly one of, the force application points associated respectively therewith, without circumferential movement play in each instance. In other words, a restoring element 42 engages at a force application point cooperating therewith in the inactive position such that the force application point or a pin behind the latter also functions as abutment in the inactive position without deflection of the deflection mass. A second force application point which may also possibly be provided for the restoring element 42 is arranged on the other side thereof with circumferential play (see FIG. 24).

Figure 27:
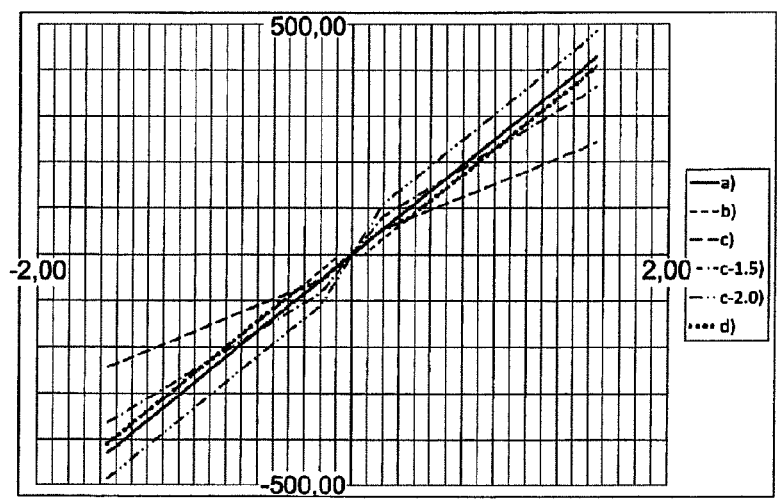
FIG. 27 is a graph of comparison of stiffness characteristic curves for alternate and one-sided actuation of restoring elements.

FIG. 27 shows a comparison of stiffness characteristic curves (force over bending for a speed (DRZ)) of different embodiment forms by way of summary. Curve a) relates to a play-free alternating actuation of the restoring elements according to FIG. 14. Curve b) relates to an alternating actuation of the restoring elements with play according to FIG. 13. Curve c) relates to a play-free mutually preloaded, one-sided actuation of the restoring elements according to FIG. 23. Curve c-1.5) relates to a play-free, mutually preloaded, one-sided actuation of 1.5 times the quantity of restoring elements. Curve c-2.0) relates to a play-free, mutually preloaded, one-sided actuation of 2.0 times the quantity of restoring elements compared to curve c). Curve d) relates to a mutually preloaded, alternating actuation of the restoring elements with play according to FIG. 24.

Various possible uses of the above-described mutually preloaded torsional vibration damping arrangement 10 or 10' will be discussed in the following referring to FIGS. 28 to 32.

Figure 28:
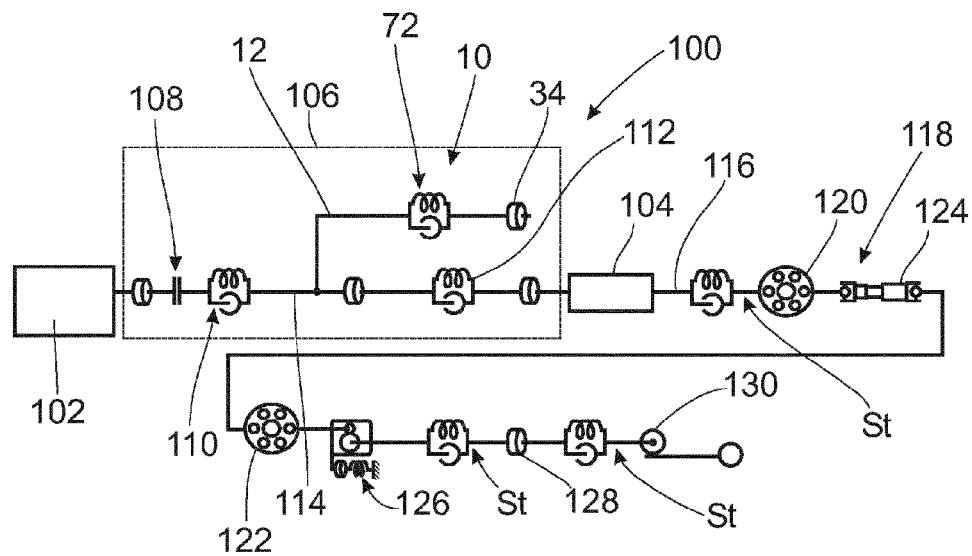
FIG. 28 is a schematic depiction of a drivetrain for a vehicle with a torsional vibration damping arrangement.

In FIG. 28, a drivetrain 100 comprises a drive unit 102 formed, for example, as an internal combustion engine. In the torque path between the drive unit 102 and a transmission 104, for example, an automatic transmission, a torsional vibration damping arrangement 10 according to one embodiment is arranged in a rotating wet space 106 of a starting element, designated generally by 108. This torsional vibration damping arrangement 10 has the stiffness provided by the deflection mass pendulum arrangements 72 with the deflection masses 34 and is coupled by carrier 12 to a rotating component of the drivetrain 100. Two torsional vibration dampers 110, 112 acting in series can be provided in the rotating wet space 106, each torsional vibration damper 110, 112 having a primary side and a secondary side and damper springs which are operative therebetween and via which the torque transmitted between the drive unit 102 and the transmission 104 is conducted. In the depicted embodiment example, a secondary side of torsional vibration damper 110 is coupled with a primary side of torsional vibration damper 112 to provide an intermediate mass or an intermediate element 114 to which the carrier 12 is connected. Downstream of the transmission 104 and transmission output shaft 116 in the torque path is a propeller shaft arrangement, designated generally by 118, with respective joint disks 120, 122 and a propeller shaft 124 located therebetween. On the output side, the propeller shaft 124 is coupled to an axle gear or differential 126. The torque is transmitted from the latter to rims 128 and tires 130. Respective stiffnesses are shown in association with various transmission shafts, e.g., the transmission output shaft 116 of a transmission shaft between the differential and the rims 128 or rims 128 and tires 130, based on the inherent elasticity thereof.

Figure 29:
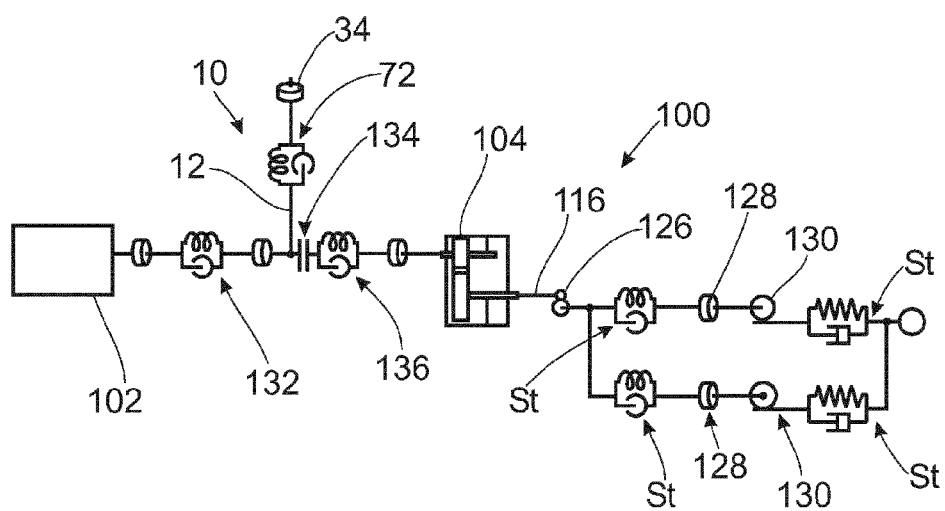
FIG. 29 is a view corresponding to FIG. 28 showing an alternative mode of construction.

FIG. 28 shows a drivetrain 100 mounted longitudinally in driving direction, i.e., with longitudinally oriented drive unit 102 and longitudinally oriented transmission 104, FIG. 29 shows a drivetrain 100 with transversely mounted drive unit 102 and transmission 104. Located therebetween is a torsional vibration damper 132, for example, in the form of a dual mass flywheel, the secondary side thereof being coupled with a friction clutch, for example, a dry friction clutch 134. A clutch disk 136 likewise formed, for example, with a torsional vibration damper conveys the torque to the transmission 104 formed, for example, as a manual shift transmission. The carrier 12 of the torsional vibration damping arrangement 10 is coupled to the secondary side of the torsional vibration damper or dual mass flywheel 132. Downstream of the transmission output shaft 116 on the output side is a differential 126 and the drive axle with its two rims 128 and tires 130. Here again, respective stiffnesses of the drive shafts and wheels are illustrated by St.

Figure 30:
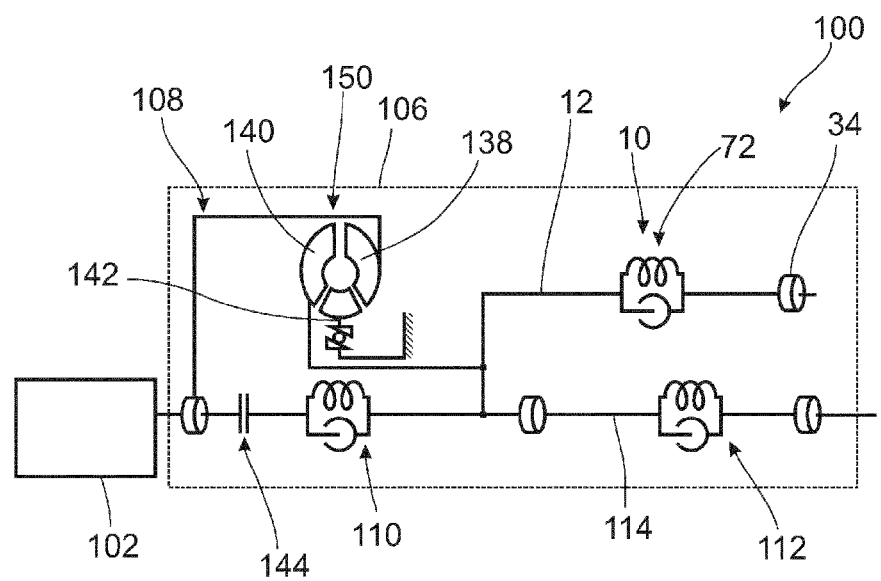
FIG. 30 is a view corresponding to FIG. 28 showing an alternative mode of construction.

FIG. 30 shows a further example of a portion of a drivetrain 100 with a hydrodynamic torque converter 150 as starting element 108 downstream of a drive unit 102. Provided in the housing or rotating wet space 106 thereof and rotating along with the latter is an impeller 138. A turbine 140 is provided axially opposed to the latter. A stator, designated generally by 142, is located between the impeller 138 and turbine 140. Parallel to the hydrodynamic torque transmission path which comprises the fluid circulation between the impeller, turbine and stator, a torque transmission path can be arranged via a lockup clutch 144. Downstream of the lockup clutch are the two torsional vibration dampers 110, 112, an intermediate mass 114 being formed therebetween. The turbine 140 and the carrier 12 of the torsional vibration damping arrangement 10 are coupled to this intermediate mass 114. It is noted here that the torsional vibration dampers which can also be seen, for example, in FIG. 30 can have a known construction with two cover disks and a central disk located therebetween. Either the two cover disks or the central disk is associated with the primary side, the other component then being associated with the secondary side. In each torsional vibration damper of this kind, one or more spring sets can operate in parallel or in series, possibly also in a stepped manner in order to achieve a correspondingly stepped damping characteristic.

Torsional vibrations or torsional irregularities transmitted into the input region of the hydrodynamic torque converter via the drive unit 102 can be reduced or damped initially in the torsional vibration damper 110 upstream in the torque path when the lockup clutch 144 is engaged or is transmitting torque. The torsional vibrations still being transmitted into the intermediate mass 114 can be further reduced or eliminated through the action of the torsional vibration damping arrangement 10 coupled therewith by corresponding configuration to an excitation order. A still further filtering or vibration damping can then be carried out through the further torsional vibration damper 112 downstream in the torque path.

It will be appreciated that different variations can be carried out in this respect. For example, the turbine 140 could be coupled directly to a transmission input shaft, i.e., the secondary side of the torsional vibration damper 112, which increases the mass inertia of a transmission input shaft. As a result, neither of the two torsional vibration dampers 110, 112 would be operative in the operative hydrodynamic range of the torque converter with lockup clutch 144 disengaged.

In a further variant, the turbine 140 could provide the deflection mass 34 or a part of the deflection mass 34. A merging of functions and, therefore, a compact constructional size can be ensured in this way. As a result of a configuration of this kind, the torsional vibration damping arrangement 10 is also utilized for torque transmission whenever the lockup clutch 144 is disengaged and a torque is to be transmitted via the turbine 140, and the configuration can then be such that the rotational angle limiting functionality of the bolts 40 and apertures 36 is operative in this condition, i.e., the restoring elements 42 are not loaded excessively. When the lockup clutch 144 is engaged, the turbine only operates as deflection mass 34 so that it also contributes to a viscous damping because of the fluidic interaction.

The lockup clutch 144 could also, of course, be located in the torque path between the two torsional vibration dampers 110, 112 or even downstream thereof, in which case it must be ensured that the turbine 140 is coupled to the lockup clutch 144 on the output side. Correspondingly, the carrier 12 of the torsional vibration damping arrangement 10 could also, of course, be coupled with the primary side of torsional vibration damper 110 or the secondary side of torsional vibration damper 112.

Figure 31:
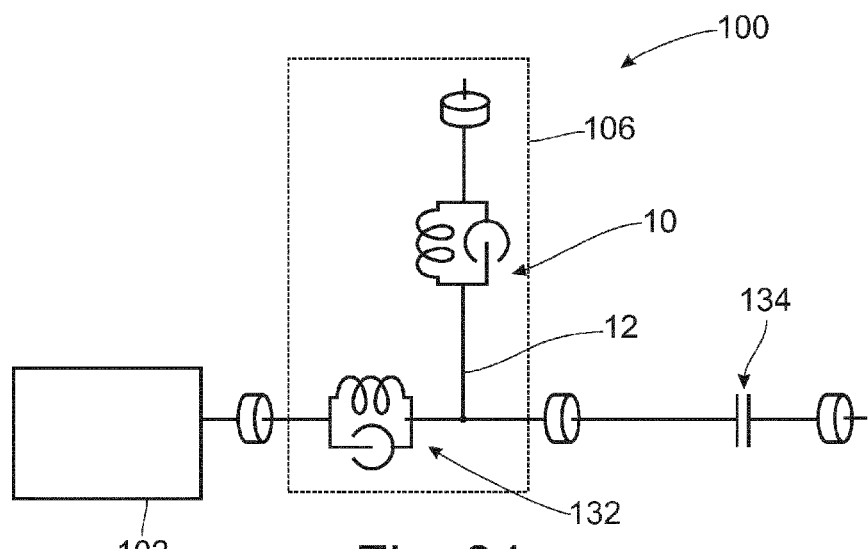
FIG. 31 is a view corresponding to FIG. 28 showing an alternative mode of construction.

FIG. 31 is constructional variant of a drivetrain 100 in which the drive unit 102 transmits its torque via a dual mass flywheel 132 integrated, for example, in a rotating wet space 106. The torsional vibration damping arrangement 10 is connected by the carrier 12 thereof on the secondary side of the dual mass flywheel 132. In this case, there is a downstream starting element, for example, a friction clutch 134, in the torque path.

Figure 32:
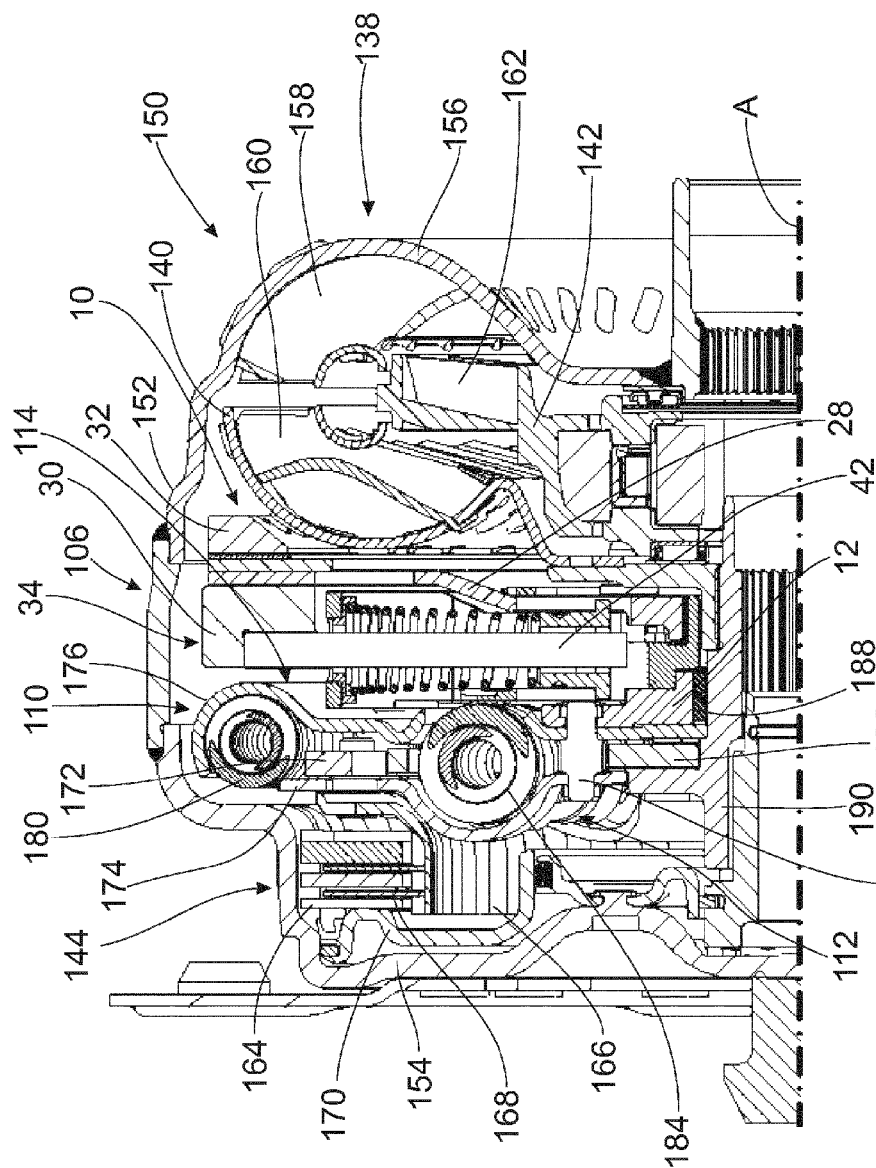
FIG. 32 is a fragmentary longitudinal section through a hydrodynamic torque converter with a torsional vibration damping arrangement constructed according to the invention integrated therein.

FIG. 32 is constructive layout of a hydrodynamic torque converter 150 in fragmentary longitudinal section. The housing 152 of the hydrodynamic torque converter 150 provides the rotating wet space 106 and comprises a drive-side housing shell 154 and an output-side housing shell 156 which also simultaneously forms an impeller shell and carries at its inner side a plurality of impeller blades 158 successively in circumferential direction around the axis of rotation A. The turbine 140 with turbine blades 160 is axially opposed to the impeller 138 provided in this way. The stator 142 with stator blades 162 is located between the impeller 138 and turbine 140.

The lockup clutch 144 comprises drive-side friction elements or plates 164 which are coupled to rotate with the drive-side housing shell 154 and output-side friction elements or plates 168 which are coupled to rotate with a friction element carrier 166. The latter can be pressed together by a clutch piston 170 for torque transmission and for engaging the lockup clutch 144. The torsional vibration damper 110 which is downstream of the lockup clutch 144 in the torque path and positioned here on the radially outer side comprises as primary side a central disk element 172 coupled with the friction element carrier 166. Located axially on both sides of the latter are cover disk elements 174, 176, the radially outer region of which essentially provides the secondary side of the torsional vibration damper 110. A torque is transmitted between the central disk element 172, i.e., the primary side, and the cover disk elements 174, 176, i.e., the secondary side, through damper springs 180 of the torsional vibration damper 110.

The radially inner areas of the cover disk elements 174, 176 form a secondary side of the second torsional vibration damper 112 which is positioned radially inwardly. A further central disk element 182 which essentially provides a secondary side of the further torsional vibration damper 112 is located axially between these cover disk elements which are fixedly connected to one another and is coupled with the cover disk elements 174, 176 through damper springs 184 for torque transmission.

The two cover disk elements 174, 176 also essentially provide the intermediate mass arrangement 114 to which the carrier 12 of a torsional vibration damping arrangement 10 constructed according to the invention is connected, for example, by bolts 186 which also fixedly connect the two cover disk elements 174, 176 to one another. The flywheel mass 34 of the torsional vibration damping arrangement 10 comprises the two mass rings 30, 32 and the carrier disk 28 and is located axially substantially between the two radially staggered torsional vibration dampers 110, 112 and the turbine 140. Owing to the shape of the mass ring 32 with radially inwardly angled contour, this mass ring 32 can be positioned so as to axially overlap the turbine 140, which allows an axially compact constructional size. According to one embodiment, the vibration absorber arrangement 10 can be coupled to the secondary side of at least one of the torque-transmitting rotational or torsional vibration dampers 110, 112. Accordingly, broadly speaking, the speed-adaptive vibration damper 10 is an additional mass that can be coupled to the drive system or at least one of the torsional vibration dampers 110, 112 via a variable spring system. With respect to the connection of the torsional vibration damping arrangement 10, shown in FIG. 32, to the secondary side of a rotational or torsional vibration damper 110, 112, for example, inside a torque converter or a dual mass flywheel (not shown), the torsional vibration damping arrangement 10 can be constructed so as to be comparatively light because the residual excitation at the site of the connection of the torsional vibration damping arrangement 10 behind the series-connected damper springs 180 and 184 can be comparatively small.

It will be seen that the carrier 12 is rotatably mounted on the radially inner side via a bearing 188, for example, a friction bearing or rolling element bearing, on an output hub 190 of the torsional vibration damping arrangement 10 connected to the central disk 182. The turbine 140 is also connected to this output hub 190, for example, by a toothed engagement, so as to rotate together with it such that the torque transmitted via the turbine is transmitted into the output hub 190 while circumventing the two torsional vibration dampers 110, 112 operating in series. Alternatively, as has already been stated, the turbine 140 can be coupled to the carrier 12 or, generally, the intermediate mass 114 or to the deflection mass 34 in order to increase the mass inertia thereof.

The features disclosed in the preceding description, appended claims and drawings can be significant individually as well as in any combination for implementing an embodiment example in its various refinements.

While some aspects have been described in connection with an apparatus, it will be appreciated that these aspects also represent a description of a corresponding method so that a module or a component of an apparatus is also to be comprehended as a corresponding method step or as a feature of a method step. Similarly, aspects which have been described in connection with, or as, a method step also represent a description of a corresponding module or detail or feature of a corresponding apparatus.

The embodiment examples described above merely represent an illustration of the principles of the present invention. It will be appreciated that modifications and variations of the arrangements and details described herein will be clear to other skilled persons. Therefore, it is intended that the invention be limited only by the protective scope of the appended patent claims and not by the specific details which were presented herein with reference to the description and explanation of the embodiment examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
   a carrier arrangement configured to rotate around an axis of rotation;
   a plurality of radially extending, flexible restoring elements which are arranged in a circumferential direction; and
   a deflection mass movable in the circumferential direction relative to the carrier arrangement, wherein the carrier arrangement and the deflection mass are coupled to be rotatable relative to one another via the plurality of radially extending, flexible restoring elements,
   wherein each restoring element is deformable around at least one force application point associated with each restoring element and is movable in a radial direction under centrifugal force, and
   wherein a first restoring element of the plurality of radially extending, flexible restoring elements is preloaded in a first direction in an inactive position of the torsional vibration damping arrangement, and in that a second restoring element of the plurality of radially extending, flexible restoring elements is preloaded in a second direction opposite to the first direction in the inactive position,
   wherein exactly one force application point that is movable in the radial direction is associated with each restoring element, wherein the force application point of the first restoring element and second restoring element are arranged on different respective sides of the restoring elements to achieve the opposed preloading.

2. The torsional vibration damping arrangement according to claim 1, wherein opposed preloading forces resulting from the opposed preloading in the inactive position are identical in amount.

3. The torsional vibration damping arrangement according to claim 1, wherein the first restoring element in the inactive position of the torsional vibration damping arrangement is preloaded in the first direction by direct contact with the force application point associated with the first restoring element, and the second restoring element in the inactive position is preloaded in the second direction by direct contact with the force application point associated with the second restoring element.

4. The torsional vibration damping arrangement according to claim 1, wherein at least one movable force application point is provided through a flyweight that is movable along a respective restoring element of the plurality of radially extending, flexible restoring elements in the radial direction.

5. The torsional vibration damping arrangement according to claim 4, wherein a position of the at least one movable force application point at the flyweight is asymmetrical with respect to the respective restoring element in the inactive position.

6. The torsional vibration damping arrangement according to claim 5, wherein the at least one force application point comprises two first application points and two second application points, wherein an asymmetrical arrangement of the two first force application points with respect to the first restoring element is the inverse of the asymmetrical arrangement of two second force application points with respect to the second restoring element.

7. The torsional vibration damping arrangement according to claim 4, wherein the flyweight is acted upon in the inactive position by a preloading force acting radially inward.

8. The torsional vibration damping arrangement according to claim 1, wherein the at least one force application point comprises two force application points that are movable in the radial direction are associated with each restoring element, wherein the two force application points move radially under centrifugal force opposite to one another on different sides of each restoring element, and wherein the two force application points are arranged asymmetrically with respect to each restoring element in the inactive position to achieve the opposed preloading.

9. The torsional vibration damping arrangement according to claim 1, wherein the first restoring element and the second restoring element are arranged relative to at least one of the force application points without circumferential movement play.

10. The torsional vibration damping arrangement according to claim 1, wherein the first restoring element and second restoring element form a pair of restoring elements arranged adjacent to one another in the circumferential direction, and wherein the torsional vibration damping arrangement has a plurality of pairs of restoring elements arranged in the circumferential direction.

11. The torsional vibration damping arrangement according to claim 1, wherein each restoring element comprises a restoring spring configured as one of a leaf spring and a bar spring, having a linear force characteristic curve.

12. The torsional vibration damping arrangement according to claim 1, wherein each restoring element is fixed with respect to at least one of the deflection mass and the carrier arrangement.

13. A drivetrain for a vehicle, comprising:
   at least one torsional vibration damping arrangement having:
      a carrier arrangement configured to rotate around an axis of rotation;
      a plurality of radially extending, flexible restoring elements which are arranged in a circumferential direction; and
      a deflection mass movable in the circumferential direction relative to the carrier arrangement, wherein the carrier arrangement and the deflection mass are coupled to be rotatable relative to one another via the plurality of radially extending, flexible restoring elements,
      wherein each restoring element is deformable around a force application point associated with each restoring element and is movable in a radial direction under centrifugal force, and
      wherein a first restoring element of the plurality of radially extending, flexible restoring elements is preloaded in a first direction in an inactive position of the at least one torsional vibration damping arrangement, and in that a second restoring element of the plurality of radially extending, flexible restoring elements is preloaded in a second direction opposite to the first direction in the inactive position,
wherein exactly one force application point that is movable in the radial direction is associated with each restoring element,
wherein the force application point of the first restoring element and second restoring element are arranged on different respective sides of the restoring elements to achieve the opposed preloading.

14. The drivetrain according to claim 13, further comprising:
a starting element configured as one of a hydrodynamic torque converter, a fluid clutch, a wet friction clutch, and a dry friction clutch; and
wherein the at least one torsional vibration damping arrangement is provided in a region of the starting element.

15. The drivetrain according to claim 13, wherein the at least one torsional vibration damper arrangement comprises at least one torsional vibration damper having a primary side and a secondary side which is rotatable with respect to the primary side against a restoring action of a spring arrangement, wherein the carrier arrangement of the at least one torsional vibration damping arrangement is connected to the primary side or secondary side of the at least one torsional vibration damper to be fixed with respect to rotation relative to the primary side or secondary side of the at least one torsional vibration damper.

16. The drivetrain according to claim 15, wherein the at least one torsional vibration damper has a first spring arrangement and a second spring arrangement, wherein an intermediate element is rotatable with respect to the primary side against a restoring action of the first spring arrangement and the secondary side is rotatable with respect to the intermediate element against the restoring action of the second spring arrangement.

17. The drivetrain according to claim 16, wherein the carrier arrangement of the at least one torsional vibration damping arrangement is connected to the intermediate element of the at least one torsional vibration damper to be fixed with respect to rotation relative to the intermediate element of the at least one torsional vibration damper.

18. A torsional vibration damping arrangement for a drivetrain of a vehicle, comprising:
a carrier arrangement configured to rotate around an axis of rotation;
a plurality of radially extending, flexible restoring elements which are arranged in a circumferential direction; and
a deflection mass movable in the circumferential direction relative to the carrier arrangement, wherein the carrier arrangement and the deflection mass are coupled to be rotatable relative to one another via the plurality of radially extending, flexible restoring elements,
wherein each restoring element is deformable around at least one force application point associated with each restoring element and is movable in a radial direction under centrifugal force, and
wherein a first restoring element of the plurality of radially extending, flexible restoring elements is preloaded in a first direction in an inactive position of the torsional vibration damping arrangement, and in that a second restoring element of the plurality of radially extending, flexible restoring elements is preloaded in a second direction opposite to the first direction in the inactive position,
wherein the first restoring element and second restoring element form a pair of restoring elements, and a first flyweight that is movable in the radial direction along the first restoring element and a second flyweight that is movable in the radial direction along the second restoring element contact the first restoring element and second restoring element on different sides of the restoring element preload the pair of restoring elements in opposite directions in the inactive position.

* * * * *